US012431058B2

United States Patent

(12) United States Patent
Li et al.

(10) Patent No.: US 12,431,058 B2
(45) Date of Patent: Sep. 30, 2025

(54) DISPLAY PANEL, METHOD FOR DISPLAY CONTROL THEREFOR, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Jian Li, Beijing (CN); Shuai Hou, Beijing (CN); Xuesong Tian, Beijing (CN); Yuanzhang Zhu, Beijing (CN); Jianbo Xian, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/291,667

(22) PCT Filed: Apr. 24, 2023

(86) PCT No.: PCT/CN2023/090338
§ 371 (c)(1),
(2) Date: Jan. 24, 2024

(87) PCT Pub. No.: WO2024/221178
PCT Pub. Date: Oct. 31, 2024

(65) Prior Publication Data
US 2025/0087130 A1 Mar. 13, 2025

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01); *G09G 2330/021* (2013.01)

(58) Field of Classification Search
CPC ......... G09G 3/2092; G09G 2310/0267; G09G 2310/08; G09G 2330/021; G09G 3/3266; G09G 3/3677; G09G 3/20
See application file for complete search history.

(56) References Cited

U.S. PATENT DOCUMENTS 10,802,788 B2 * 10/2020 Hu ........................... H04B 5/48
11,361,713 B1 * 6/2022 Fu ........................ G09G 3/3241
(Continued)

FOREIGN PATENT DOCUMENTS

CN 109427817 A 3/2019
CN 110517633 A 11/2019
(Continued)

*Primary Examiner* — Jose R Soto Lopez
(74) *Attorney, Agent, or Firm* — XSENSUS LLP

(57) ABSTRACT

Provided is a display panel. In the display panel, a plurality of first drive units included in a first drive circuit can output gate driving signals based on a turn-on signal provided by a first turn-on line coupled with the first drive units. A plurality of second drive units included in a second drive circuit can output gate driving signals based on a turn-on signal provided by a second turn-on line coupled with the second drive units. First gating units can control on-off between the corresponding first drive units and one part of pixels based on an enable signal provided by a first enable line coupled with the first gating units. Second gating units can control on-off between the corresponding second drive units and the other part of the pixels based on an enable signal provided by a second enable line coupled with the second gating units.

18 Claims, 9 Drawing Sheets

(56) References Cited

U.S. PATENT DOCUMENTS

| | | | | |
|---|---|---|---|---|
| 12,004,384 | B2 * | 6/2024 | Park | H10D 86/423 |
| 2005/0156920 | A1 * | 7/2005 | Tanaka | G09G 3/2011 345/204 |
| 2006/0012549 | A1 | 1/2006 | Ikeda | |
| 2012/0249606 | A1 * | 10/2012 | Teranishi | G09G 3/2074 345/690 |
| 2013/0321251 | A1 * | 12/2013 | Kang | G09G 3/3614 345/87 |
| 2014/0197744 | A1 * | 7/2014 | Choi | G09G 3/3233 315/130 |
| 2015/0199932 | A1 * | 7/2015 | Ohara | G09G 3/3258 345/212 |
| 2015/0340102 | A1 | 11/2015 | Qian | |
| 2016/0035305 | A1 * | 2/2016 | Jin | G09G 3/3406 345/205 |
| 2017/0110050 | A1 * | 4/2017 | Park | G09G 3/3208 |
| 2018/0005573 | A1 * | 1/2018 | Kim | G09G 3/3266 |
| 2018/0053464 | A1 | 2/2018 | Lu et al. | |
| 2018/0301102 | A1 | 10/2018 | Yi | |
| 2019/0067218 | A1 | 2/2019 | Lin et al. | |
| 2019/0325845 | A1 * | 10/2019 | Zhu | G09G 3/2074 |
| 2019/0341440 | A1 * | 11/2019 | Cha | G09G 3/3266 |
| 2020/0175912 | A1 * | 6/2020 | Lee | G09G 3/3233 |
| 2021/0125546 | A1 * | 4/2021 | Fei | G09G 3/20 |
| 2021/0366408 | A1 * | 11/2021 | In | G09G 3/3266 |
| 2021/0384289 | A1 * | 12/2021 | Li | G09G 3/3233 |
| 2021/0391403 | A1 * | 12/2021 | Yang | H10D 86/481 |
| 2022/0068202 | A1 * | 3/2022 | Kim | G09G 5/14 |
| 2022/0068221 | A1 * | 3/2022 | Ha | G09G 3/3266 |
| 2022/0077265 | A1 * | 3/2022 | Ma | H10K 59/1213 |
| 2022/0199039 | A1 * | 6/2022 | Lee | G09G 3/3291 |
| 2022/0230581 | A1 * | 7/2022 | Cho | G09G 3/32 |
| 2022/0270530 | A1 * | 8/2022 | Wang | G09G 3/035 |
| 2022/0358872 | A1 * | 11/2022 | Lim | G09G 3/2092 |
| 2022/0375423 | A1 * | 11/2022 | Cao | G09G 3/3688 |
| 2023/0154411 | A1 * | 5/2023 | Lee | G06V 40/1306 345/204 |
| 2023/0209936 | A1 * | 6/2023 | Woo | G09G 3/3266 345/204 |
| 2023/0215314 | A1 * | 7/2023 | Ke | H10K 59/00 345/443 |
| 2024/0134486 | A1 * | 4/2024 | An | H10K 50/8445 |
| 2024/0212595 | A1 | 6/2024 | Yu et al. | |
| 2024/0222516 | A1 * | 7/2024 | Yi | H10D 86/471 |
| 2024/0249687 | A1 * | 7/2024 | Lu | G09G 3/3275 |

FOREIGN PATENT DOCUMENTS

| | | | |
|---|---|---|---|
| CN | 111477185 | A | 7/2020 |
| CN | 111933038 | A | 11/2020 |
| CN | 112562570 | A | 3/2021 |
| CN | 112951160 | A | 6/2021 |
| CN | 113129832 | A | 7/2021 |
| CN | 114038418 | A | 2/2022 |
| CN | 114974114 | A | 8/2022 |
| CN | 115424584 | A | 12/2022 |
| CN | 115775547 | A | 3/2023 |
| CN | 115842028 | A | 3/2023 |
| JP | 2012-078699 | A | 4/2012 |

* cited by examiner

DISPLAY PANEL, METHOD FOR DISPLAY CONTROL THEREFOR, AND DISPLAY DEVICE

CROSS-REFERENCE TO RELATED APPLICATION

This application is a U.S. national phase application based on PCT/CN2023/090338, filed on Apr. 24, 2023, the content of which is incorporated herein by reference in its entirety.

TECHNICAL FIELD

The present disclosure relates to the field of display technologies, and in particular, relates to a display panel, a method for display control therefor, and a display device.

BACKGROUND

Low temperature polycrystalline oxide (LTPO) display products can achieve low frequency display to reduce display power consumption, which are receiving increasing attention from the market.

SUMMARY

A display panel, a method for display control therefor, and a display device are provided. The technical solutions are as follows.

In an aspect, a display panel is provided. The display panel includes:

a substrate having a display region and a peripheral region at least partially surrounding the display region;

a plurality of pixels arranged in an array and disposed in the display region;

a first drive circuit disposed in the peripheral region, the first drive circuit including: a plurality of first drive units cascaded, and a plurality of first gating units in one-to-one correspondence with the plurality of first drive units;

a second drive circuit disposed in the peripheral region, the second drive circuit including: a plurality of second drive units cascaded, and a plurality of second gating units in one-to-one correspondence with the plurality of second drive units, wherein at least one of the first drive units and at least one of the second drive units are respectively disposed on both sides of the substrate in a pixel row direction, each of the first gating units and a corresponding first drive unit are disposed on a same side of the substrate, and each of the second gating units and a corresponding second drive unit are disposed on a same side of the substrate;

each of the first drive units is coupled with one part of pixels in at least one row of pixels by a corresponding first gating unit, which is also coupled with a first enable line and is configured to control on-off between the first drive unit and the one part of the pixels based on a first enable signal provided by the first enable line; and the plurality of first drive units are also coupled with a first turn-on line and are configured to output first gate driving signals based on a first turn-on signal provided by the first turn-on line; and each of the second drive units is coupled with another part of the pixels in the at least one row of pixels by a corresponding second gating unit, which is also coupled with a second enable line and is configured to control on-off between the second drive unit and the another part of the pixels based on a second enable signal provided by the second enable line; and the plurality of second drive units are also coupled with a second turn-on line and are configured to output second gate driving signals based on a second turn-on signal provided by the second turn-on line.

Optionally, the plurality of first drive units are disposed on a first side of the both sides, and the plurality of second drive units are disposed on a second side of the both sides.

Optionally, among the plurality of first drive units, one part of the first drive units are disposed on a first side of the both sides, and a rest of the first drive units other than the one part of the first drive units are disposed on a second side of the both sides; and among the plurality of second drive units, one part of the second drive units are disposed on the first side of the both sides, and a rest of the second drive units other than the one part of the second drive units are disposed on the second side of the both sides.

Optionally, each of the first drive units is coupled with one part of pixels in a row of pixels by a corresponding first gating unit; and among the plurality of first drive units, individual first drive units coupled with even-numbered rows of pixels are disposed on the first side, and individual first drive units coupled with odd-numbered rows of pixels are disposed on the second side.

Optionally, each of the second drive units is coupled with another part of the pixels in a row of pixels by a corresponding second gating unit; and among the plurality of second drive units, individual second drive units coupled with the even-numbered rows of pixels are disposed on the first side, and individual second drive units coupled with the odd-numbered rows of pixels are disposed on the second side.

Optionally, the individual first and second drive units disposed on the first side are alternately arranged in a pixel column direction in sequence; and the individual second and first drive units disposed on the second side are alternately arranged in the pixel column direction in sequence.

Optionally, each of the first drive units is coupled with a first drive line by a corresponding first gating unit, and the first drive line is coupled with the one part of the pixels; each of the second drive units is coupled with a second drive line by a corresponding second gating unit, and the second drive line is coupled with another part of the pixels; and the plurality of first drive units are cascaded by the first drive line, and the plurality of second drive units are cascaded by the second drive line.

Optionally, in a case that the plurality of first drive units are disposed on the first side of the both sides and the plurality of second drive units are disposed on the second side of the both sides, the first drive line and the second drive line are independent from each other.

Optionally, in a case that among the plurality of first drive units, one part of the first drive units are disposed on a first side of the both sides, and a rest of the first drive units other than the one part of the first drive units are disposed on the second side of the both sides; and among the plurality of second drive units, one part of the second drive units are disposed on the first side of the both sides, and a rest of the second drive units other than the one part of the second drive units are disposed on the second side of the both sides:

the first drive line, in addition to coupling the pixels, also runs through the display region, and cascades the first drive units disposed on the first side and the first drive units disposed on the second side;

the second drive line, in addition to coupling the pixels, also runs through the display region, and cascades the second drive units disposed on the first side and the second drive units disposed on the second side; and the first and second drive lines coupled with a same row of pixels are overlapped in the display region.

Optionally, one part of the first drive line for coupling pixels and one part of the first drive line for cascading the first drive units are disposed on different layers; one part of the second drive line for coupling pixels and one part of the second drive line for cascading the second drive units are disposed on different layers; and overlapped parts of the first and second drive lines are disposed on different layers.

Optionally, each of the pixels includes: a gate metal layer, an insulation layer, and a source-drain metal layer, which are sequentially stacked on one side of the substrate, wherein in the first drive line, the one part for coupling the pixels is disposed on a same layer as the gate metal layer, the one part for cascading the first drive units is disposed on a same layer as the source-drain metal layer, and the one part for coupling the pixels and the one part for cascading the first drive units are switched by a via hole running through the insulation layer; and in the second drive line, the one part for coupling the pixels is disposed on a same layer as the gate metal layer, the one part for cascading the second drive units is disposed on the a layer as the source-drain metal layer, and the one part for coupling the pixels and the one part for cascading the second drive units are switched by a via hole running through the insulation layer.

Optionally, the substrate includes:

a left display region and a right display region, which are arranged along the pixel row direction from a first column of pixels to a last column of pixels, the left display region including the one part of the pixels, and the right display region including the another part of the pixels; and an upper display region and a lower display region, which are arranged along a pixel column direction from a first row of pixels to a last row of pixels, the upper display region and the lower display region each including at least one row of pixels.

Optionally, a frame rate of the upper display region is greater than or equal to a frame rate of the lower display region.

Optionally, the left display region and the right display region have a same area and include a same number of pixels; and/or, the upper display region and the lower display region have a same area and include a same number of pixels.

Optionally, among the plurality of first gating units and the plurality of second gating units, individual gating units disposed on a same side of the substrate share a same enable line.

Optionally, each of the first gating units includes: a first gating switch tube; and each of the second gating units includes: a second gating switch tube;

wherein a gate of the first gating switch tube is coupled with the first enable line, a first electrode of the first gating switch tube is coupled with a corresponding first drive unit, and a second electrode of the first gating switch tube is coupled with the one part of the pixels; and a gate of the second gating switch tube is coupled with the second enable line, a first electrode of the second gating switch tube is coupled with a corresponding second drive unit, and a second electrode of the second gating switch tube is coupled with the another part of the pixels.

Optionally, each of the first drive units is coupled, by the corresponding first gating unit, with one part of the pixels in the at least one row of pixels adjacent to the first gating unit; each of the second drive units is coupled, by the corresponding second gating unit, with the another part of the pixels in the at least one row of pixels adjacent to the second gating unit; and individual pixels in the one part of the pixels are adjacent to each other, and individual pixels in the another part of the pixels are adjacent to each other.

Optionally, the display panel includes: a low temperature polycrystalline oxide (LTPO) display panel.

In another aspect, a method for display control for controlling the display panel as defined in the above aspect is provided. The method includes:

determining refresh requirements of different regions in the display region provided in the substrate, wherein the different regions include a left region and a right region, which are arranged along the pixel row direction, and/or an upper region and a lower region, which are arranged along a pixel column direction, and the refresh requirements are configured to indicate whether refresh is required and a refresh frequency;

transmitting, in response to a frame synchronization signal and based on the refresh requirements, the first enable signal to the first enable line coupled with the plurality of first gating units, and transmitting the second enable signal to the second enable line coupled with the plurality of second gating units, wherein the first enable signal of a first potential is configured to indicate the first gating units to control the corresponding first drive units and the one part of the pixels coupled with the first drive units to be connected, the first enable signal of a second potential is configured to indicate the first gating units to control the corresponding first drive units and the one part of the pixels coupled with the first drive units to be uncoupled, the second enable signal of a first potential is configured to indicate the second gating units to control the corresponding second drive units and the another part of the pixels coupled with the second drive units to be connected, and the second enable signal of a second potential is configured to indicate the second gating units to control the corresponding second drive units and the another part of the pixels coupled with the second drive units to be uncoupled; and transmitting, in response to the frame synchronization signal, the first turn-on signal to the first turn-on line coupled with the plurality of first drive units, and transmitting the second turn-on signal to the second turn-on line coupled with the plurality of second drive units, wherein the first turn-on signal is configured to indicate the plurality of drive units to output first gate driving signals, and the second turn-on signal is configured to indicate the plurality of second drive units to output second gate driving signals, wherein in a case that the first gating units control the first drive units and the one part of the pixels coupled with the first drive units to be connected, the first drive units transmit the first gate driving signals to the one part of the pixels; and in a case that the second gating units control the second drive units and the another part of the pixels coupled with the second drive units to be connected, the second drive units transmit the second gate driving signals to the another part of the pixels.

In still another aspect, a display device is provided. The display device includes: a driver chip, and the display panel as defined in the above aspect, wherein the driver chip is coupled with a signal line coupled with a circuit in the display panel and is configured to provide a signal to the signal line.

BRIEF DESCRIPTION OF DRAWINGS

To describe the technical solutions in embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
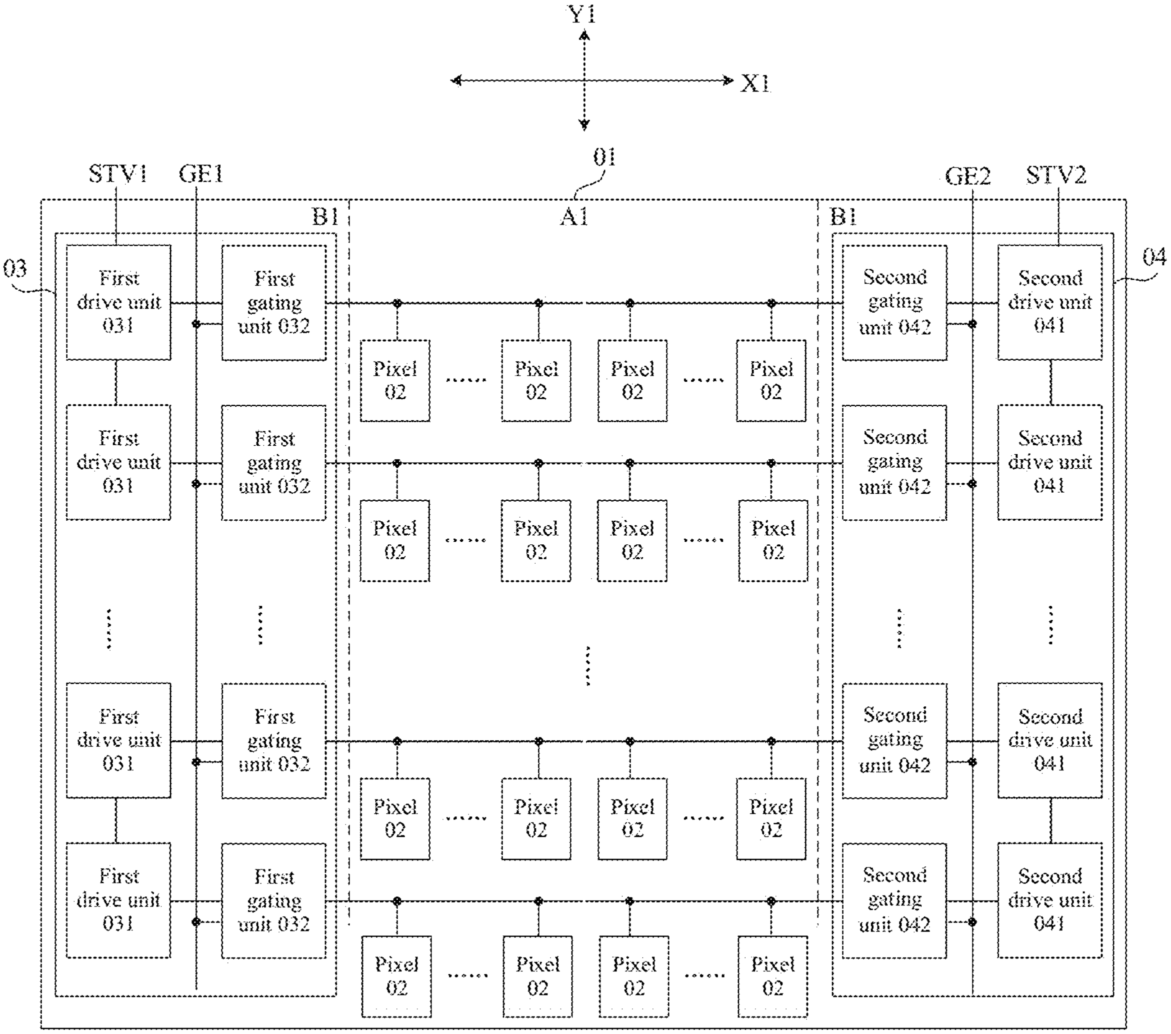
FIG. 1 is a schematic structural diagram of a display panel according to some embodiments of the present disclosure.

For clearer descriptions of the objects, technical solutions, and advantages of the present disclosure, the embodiments of the present disclosure are described in detail below in combination with the accompanying drawings.

In the related art, an LTPO display product generally includes a substrate, a plurality of rows of pixels disposed on the substrate (with each row including a plurality of columns of pixels), and a gate driver on array (GOA) circuit driving the plurality of pixels to emit light. The GOA circuit includes a plurality of GOA units cascaded, which are coupled with the plurality of rows of pixels on the substrate in one-to-one correspondence by a plurality of grid lines, and are configured to transmit gate driving signals to the plurality of rows of pixels row by row to achieve progressive scan and refresh, thereby lighting up the plurality of rows of pixels row by row.

However, due to the coupling and layout of the GOA circuit to the pixels, only full-screen refresh (that is, the frame rate is the same in different regions of the full screen) can be performed at present, and it is impossible to achieve split-screen refresh for different regions, such that the refresh flexibility is poor, resulting in higher power consumption of the display product.

It should be noted that the transistor used in all the embodiments of the present disclosure may be a thin-film transistor, or a field-effect transistor or an additional device having the same characteristics. The transistor used in the embodiments of the present disclosure is mainly a switch transistor according to its functions in a circuit. A source and a drain in the switch transistor used herein are symmetrical, and thus are interchangeable. In some embodiments of the present disclosure, the source is referred to as a first electrode, and the drain is referred to as a second electrode. According to the forms in the accompanying drawings, an intermediate electrode of the transistor is defined as a control electrode, also called a gate, a signal input terminal is defined as a source, and a signal output terminal is defined as a drain. In addition, the switch transistor used in the embodiments of the present disclosure may include either a P-type switch transistor or an N-type switch transistor. The P-type switch transistor is turned on when the gate is at a low level and turned off when the gate is at a high level; and the N-type switch transistor is turned on when the gate is at a high level, and is turned off when the gate is at a low level. In addition, a plurality of signals in the respective embodiments of the present disclosure each have a first potential and a second potential, correspondingly. The first potential and the second potential only represent two quantities of state of the potential of the signal, rather than representing a specific value for the first or second potential in the present disclosure.

As consumers pursue ultimate power consumption of display products, a low temperature polycrystalline oxide (LTPO) display panel has been designed. Due to the particularity of its material, an LTPO display panel can achieve low-frequency display at a minimum of 1 hertz (Hz) to reduce power consumption, thereby meeting the needs of users for low power consumption. In addition, it is not limited to this, and now, many manufacturers have further proposed the design of partial update on the basis of low-frequency display. Here, the partial update means that a display region of a display panel is divided into a plurality of regions, for which different frame rates can be set respectively. In this way, a locally refreshed region can be updated, and a region without the need of local refresh can be maintained, thereby implementing more intelligent refresh to further reduce power consumption. However, the existing design of the partial update can only control the minimum refresh region to a whole row. That is, it is only possible to divide a display region into a plurality of regions in pixel rows, with each region including at least one row of pixels, and the upper and lower regions each including at least one row of pixels are refreshed by region.

On this basis, to further reduce a region to be refreshed to save more power and achieve intelligence, the embodiments of the present disclosure provide a partial update design to allow both up and down partitioning as well as left and right partitioning (i.e., dividing a region in terms of pixel columns as a unit).

FIG. 1 is a schematic structural diagram of a display panel according to some embodiments of the present disclosure. As shown in FIG. 1, the display panel includes:

a substrate 01. The substrate 01 has a display region A1 and a peripheral region B1 at least partially surrounding the display region A1. Referring to FIG. 1, in the substrate 01 as shown, the peripheral region B1 partially surrounds the display region A1 and is disposed on the left and right sides of the display region A1. In addition, in other embodiments, the peripheral region B1 may also be disposed on an upper side and/or lower side of the display region A1. Alternatively, the peripheral region B1 may also surround the display region A1. That is, the display region A1 is surrounded by a gate driver on array (GOA) region. The positional relationship between the peripheral region B1 and the display region A1 is not limited in the embodiments of the present disclosure.

The display panel further includes a plurality of pixels 02 arranged in an array. The plurality of pixels 02 are disposed in the display region A1. The arrangement in an array may refer to the arrangement of the plurality of pixels 02 according to a pixel row direction X1 and a pixel column direction Y1 as shown in FIG. 1. That is, the display panel may include a plurality of rows and columns of pixels as shown in FIG. 1.

The display panel further includes a first drive circuit 03. The first drive circuit 03 is disposed in the peripheral region B1, and the first drive circuit 03 includes: a plurality of first drive units 031 cascaded, and a plurality of first gating units 032 in one-to-one correspondence with the plurality of first drive units 031.

The display panel further includes a second drive circuit 04 disposed in the peripheral region B1. The second drive circuit 04 may include: a plurality of second drive units 041 cascaded, and a plurality of second gating units 042 in one-to-one correspondence with the plurality of second drive units 041.

It should be noted that, taking the first drive circuit 03 as an example, referring to FIG. 1, the plurality of first drive units 031 in one-to-one correspondence with the plurality of first gating units 032 may refer to that: each of the first drive units 031 corresponds to one of the first gating units 032, and different ones of the first drive units 031 correspond to different ones of the first gating units 032. Moreover, the plurality of first drive units 031 cascaded may refer to that: two (or two stages) of the first drive units 031 are coupled with each other, and the latter-stage first drive unit 031 works under the drive of the first-stage first drive unit 031. Furthermore, the two first drive units 031 coupled with each other here may be adjacent to each other as shown in FIG. 1, or may not be adjacent to each other. The relevant statement of the second drive circuit 04 is the same, and will not be repeated in the embodiments of the present disclosure.

Based on the above coupling, still referring to FIG. 1, it can be seen that at least one of the first drive units 031 and at least one of the second drive units 041, described in the embodiments of the present disclosure, may be disposed on both sides of the substrate 01 in the pixel row direction X1, respectively. That is, as shown in FIG. 1, there are one or more of the first GOA units 031 and one or more of the second GOA units 041 disposed on the left and right sides of the display region A1, respectively. Furthermore, each of the first gating units 032 and the corresponding first drive unit 031 may be disposed on the same side of the substrate 01, and each of the second gating units 042 and a corresponding second drive unit 041 may be disposed on the same side of the substrate 01.

Each of the first drive units 031 is coupled with one part of pixels 02 in at least one row of pixels 02 by a corresponding first gating unit 032. Each of the first gating units 032 is also coupled with a first enable line GE1, and is configured to control on-off between the first drive units 031 and the one part of the pixels 02 based on a first enable signal provided by the first enable line GE1. The plurality of first drive units 031 are also coupled with a first turn-on line STV1, and are configured to output first gate driving signals based on a first turn-on signal provided by the first turn-on line STV1.

For example, each of the first drive units 031 shown in FIG. 1 is coupled with one part of pixels 02 in one row of pixels 02 by a corresponding first gating unit 032. Moreover, when the potential of the first enable signal provided by the first enable line GE1 is a first potential, the first gating units 032 may control the first drive units 031 and the one part of the pixels 02 coupled with the first drive units to be connected, such that first gate driving signals output by the first drive units 031 may be further transmitted to the one part of the pixels 02 to allow refresh and scan of the one part of the pixels 02, thereby driving the one part of the pixels 02 to emit light. Moreover, when the potential of the first enable signal provided by the first enable line GE1 is a second potential, the first gating units 032 may control the first drive units 031 and the one part of the pixels 02 coupled with the first drive units to be uncoupled, such that the first gate driving signals output by the first drive units 031 may be not transmitted to the one part of the pixels 02. That is, the first gating units 032 may effectively control, based on the potential of the first enable signal, whether the first gate driving signals output by the first drive units 031 enter the pixels 02.

Optionally, in the embodiments of the present disclosure, the first potential may be a valid potential, the second potential may be an invalid potential, and the first potential may be a high potential with respect to the second potential. In addition, in other embodiments, the first potential may also be a low potential with respect to the second potential.

Each of the second drive units 041 is coupled with another part of the pixels 02 in the at least one row of pixels 02 by a corresponding second gating unit 042. Each of the second gating units 042 is also coupled with a second enable line GE2, and is configured to control on-off between the second drive units 041 and the one part of the pixels 02 based on a second enable signal provided by the second enable line GE2. The plurality of second drive units 041 are also coupled with a second turn-on line STV2, and are configured to output second gate driving signals based on a second turn-on signal provided by the second turn-on line STV2.

For example, each of the second drive units 041 shown in FIG. 1 is coupled with the other part of the pixels 02 in the one row of pixels 02 by a corresponding second gating unit 042. When the potential of the second enable signal provided by the second enable line GE2 is a first potential, the second gating units 042 may control the second drive units 041 and the other part of the pixels 02 coupled with the second drive units to be connected, such that second gate driving signals output by the second drive units 041 may be further transmitted to the other part of the pixels 02 to allow refresh and scan of the other part of the pixels 02, thereby driving the other part of the pixels 02 to emit light. Moreover, when the potential of the second enable signal provided by the second enable line GE2 is a second potential, the second gating units 042 may control the second drive units 041 and the other part of the pixels 02 coupled with the second drive units to be uncoupled, such that the second gate driving signals output by the second drive units 041 may be not transmitted to the other part of the pixels 02. That is, the second gating units 042 may effectively control, based on the potential of the second enable signal, whether the second gate driving signals output by the second drive units 041 enter the pixels 02.

That is, in the display panel described in the embodiments of the present disclosure, for each row of pixels 02, one part (which may be one or more) of the pixels 02 may be coupled with the corresponding one of the first drive units 031 by one of the first gating units 032; and the other part of the pixels 02 other than the one part of the pixels 02 may be coupled with the corresponding one of the second drive units 041 by one of the second gating units 042. In other words, the plurality of pixels 02 disposed in the same row may be divided into two parts in the pixel row direction X1, and the two parts may be coupled to different drive units, respectively, to receive different gate driving signals. Furthermore, the first gating units 032 may control the on-off between the first drive units 031 and the one part of the pixels 02 in the row of pixels 02 based on the received first enable signal; and the second gating units 042 may control the on-off between the second drive units 041 and the other part of the pixels 02 in the row of pixels 02 based on the received second enable signal. In other words, the first gating units 032 and the second gating units 042 may control the on-off between the corresponding drive units and the pixels 02 based on the different enable signals provided by the different enable lines. Moreover, the first drive units 031 may output first gate driving signals based on the received first turn-on signal; and the second drive units 041 may output second gate driving signals based on the received second turn-on signal. In other words, the first drive units 031 and the second drive units 041 may output the gate driving signals based on the different turn-on signals provided by the different turn-on lines. In this way, the flexible and intelligent refresh of the pixels 02 in different regions (the upper, lower, left and right regions) of the display region A1 can be achieved by flexibly setting the turn-on signals and the enable signals, and different frame rates may be provided to the refresh of different regions, thereby achieving the purpose of frequency division design and saving more power. In addition, the arrangement of the first drive units 031 and the second drive units 041 on the left and right sides of the display region A1 respectively may also facilitate a narrow bezel design of a display device, which can then lay the foundation for a full-screen design.

It should be noted that, because the first drive units 031 and the second drive units 041 are both configured to output the gate driving signals, the first drive units 031 and the second drive units 041 in the embodiments of the present disclosure may also be referred to as the GOA units described in the above embodiments, and correspondingly, the first drive circuit 03 including the first drive units 031 and the second drive circuit 04 including the second drive units 041 may be called GOA circuits.

In summary, the embodiments of the present disclosure provide a display panel. The display panel includes a substrate having a display region and a peripheral region, a plurality of pixels disposed in the display region, and a first drive circuit and a second drive circuit that are disposed in the peripheral region. The first drive circuit includes a plurality of first drive units and a plurality of first gating units, in one-to-one correspondence. The second drive circuit includes a plurality of second drive units and a plurality of second gating units, in one-to-one correspondence. The plurality of first drive units are cascaded, are coupled with a first turn-on line, and are also coupled with one part of pixels in a row of pixels by a corresponding first gating unit. The plurality of second drive units are cascaded, are coupled with a second turn-on line, and are also coupled with another part of the pixels in the row of pixels by a corresponding second gating unit. The first gating units are also coupled with a first enable line. The second gating units are also coupled with a second enable line. The plurality of first drive units may output first gate driving signals based on a first turn-on signal provided by a first turn-on line. The plurality of second drive units may output second gate driving signals based on a second turn-on signal provided by a second turn-on line. The first gating units may control on-off between the corresponding first drive units and one part of pixels based on a first enable signal provided by the first enable line. The second gating units may control on-off between the corresponding second drive units and the other part of pixels based on a second enable signal provided by the second enable line. In this way, the pixels in different regions (the upper, lower, left, or right region) of the display region can be flexibly refreshed by flexibly setting the enable signals and the turn-on signals, and the frame rates for different regions can be different, such that partial update can be achieved, thereby reducing power consumption to achieve the purpose of intelligence and power saving.

Optionally, still referring to FIG. 1, it can also be seen that, in the embodiments of the present disclosure, each of the first drive units 031 may be coupled, by the corresponding first gating unit 032, with one part of pixels 02 in at least one row of pixels 02 adjacent to the first gating unit 032. Furthermore, each of the second drive units 041 may be coupled, by the corresponding second gating unit 042, with the other part of the pixels 02 in the at least one row of pixels 02 adjacent to the second gating unit 042. Furthermore, the individual pixels 02 in the one part of the pixel 02 may be adjacent to each other, and the individual pixels 02 in the other part of the pixels 02 may be adjacent to each other. In this way, the plurality of pixels 02 disposed in the same row may be divided into left and right parts in the pixel row direction X1, to achieve a left-right frequency division design. In addition, it can also facilitate layout and wiring to save manufacturing costs.

Optionally, still referring to FIG. 1, it can be seen that, among the plurality of first drive units 031, in the pixel column direction Y1, a first one of the first drive units 031 coupled with a first row of pixels 02 from top to bottom may be coupled with the first turn-on line STV1, and the rest of the first drive units 031 other than the first one of the first drive units 031 may be coupled with the adjacent previous-stage first drive unit 031 in turn. Similarly, among the plurality of second drive units 041, in the pixel column direction Y1, a first one of the second drive units 041 coupled with the first row of pixels 02 from top to bottom may be coupled with the second turn-on line STV2, and the rest of the second drive units 041 other than the first one of the second drive units 041 may be coupled with the adjacent previous-stage second drive unit 041 in turn. In this way, it can further facilitate wiring and layout to save manufacturing costs.

Optionally, in an optional embodiment:

as shown in FIG. 1, the plurality of first drive units 031 in the first drive circuit 03 may be disposed on a first side of both sides. The plurality of second drive units 041 in the second drive circuit 04 may be disposed on a second side of the both sides. That is, on both sides in the pixel row direction X1, the plurality of first drive units 031 cascaded may be included on one side, and the plurality of second drive units 041 cascaded may be included on the other side.

Optionally, referring to FIG. 1, the first side described in the embodiments of the present disclosure may refer to the left side of the display region A1, and the second side may refer to the right side of the display region A1. On this basis, combined with the coupling pattern in FIG. 1, the plurality of first drive units 031 disposed on the left side of the display region A1 may drive pixels in the left half of the display region A1. The plurality of second drive units 041 disposed on the right side of the display region A1 may drive pixels in the right half of the display region A1. Therefore, left-right bilateral drive are achieved, laying the foundation for the frequency division design. In addition, in other embodiments, the first side may also refer to the right side of the display region A1, and correspondingly, the second side may refer to the left side of the display region A1.

However, the optional implementation shown in FIG. 1 has been tested to be susceptible to process fluctuations or loading variations. For this, the embodiments of the present disclosure further propose another layout pattern.

Figure 2:
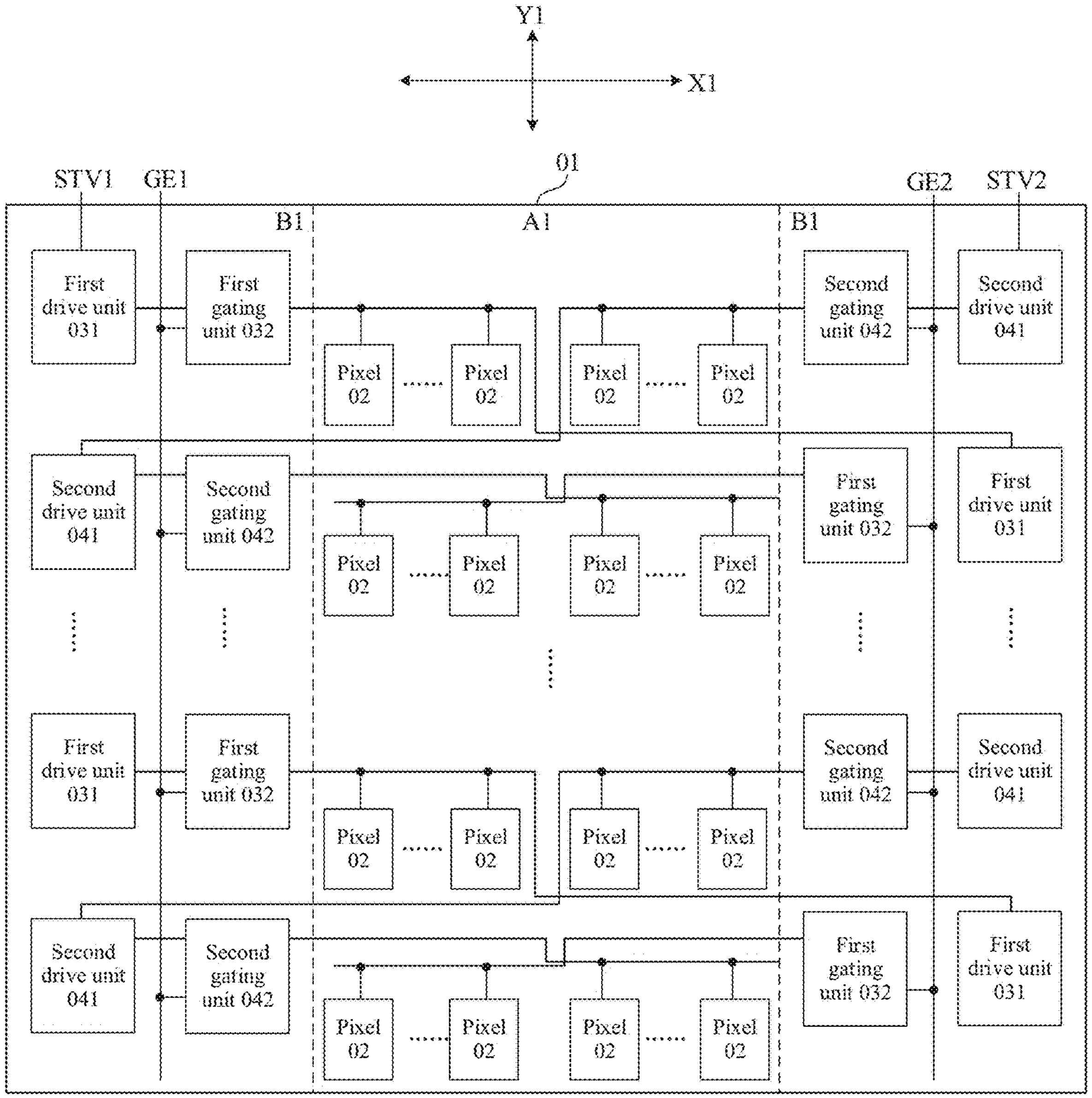
FIG. 2 is a schematic structural diagram of another display panel according to some embodiments of the present disclosure.

Optionally, in another optional embodiment:

referring to the schematic structural diagram of another display panel shown in FIG. 2, it can be seen that among the plurality of first drive units 031, one part (which may be one or more) of the first drive units 031 may be disposed on the first side (for example, left side) of the both sides, and the rest of the first drive units 031 other than the one part of the first drive units 031 may be disposed on the second side (for example, right side) of the both sides. Similarly, among the plurality of second drive units 041, one part (which may be one or more) of the second drive units 041 may be disposed on the second side of the both sides, and the rest of the second drive units 041 other than the one part of the second drive units 041 may be disposed on the second side of the both sides.

With respect to an optional implementation shown in FIG. 1, the another optional implementation can also achieve left-right bilateral drive, and allow transmission of both the first gate driving signals and the second gate driving signals by running through the whole row, which is no longer a physically simple left-right partition and is not susceptible to left-right screen splitting.

Optionally, still referring to FIG. 2, it can be seen that each of the first drive units 031 may be coupled with one part of pixels 02 in one row of pixels 02 by the corresponding first gating unit 032. On this basis, among the plurality of first drive units 031, the individual first drive units 031 coupled with even-numbered rows (i.e., the second row, the fourth row, the sixth row, . . . ) of pixels 02 may be disposed on the first side, and the individual first drive units 031 coupled with odd-numbered rows (i.e., the first row, the third row, the fifth row, . . . ) of pixels 02 may be disposed on the second side.

Optionally, still referring to FIG. 2, it can be seen that each of the second drive units 041 may be coupled with the other part of the pixels 02 in the one row of pixels 02 by the corresponding second gating unit 042. On this basis, among the plurality of second drive units 041, the individual second drive units 041 coupled with even-numbered rows of pixels 02 may be disposed on the first side, and the individual second drive units 041 coupled with odd-numbered rows of pixels 02 may be disposed on the second side.

That is, the individual first drive units 031 coupled with the odd-numbered rows of pixels 02 and the individual first drive units 031 coupled with the even-numbered rows of pixels 02 may be alternately arranged on the left and right sides of the pixel row direction X1. Moreover, the individual second drive units 041 coupled with the odd-numbered rows of pixels 02 and the individual second drive units 041 coupled with the even-numbered rows of pixels 02 may be alternately arranged on both sides of the row direction. Furthermore, the individual first drive units 031 coupled with the odd-numbered rows of pixels 02 and the individual second drive units 041 coupled with the even-numbered rows of pixels 02 may be disposed on the same side (for example, left side); and the individual first drive units 031 coupled with the even-numbered rows of pixels 02 and the individual second drive units 041 coupled with the odd-numbered rows of pixels 02 may be disposed on the same side (for example, right side).

Correspondingly, on this basis, still referring to FIG. 2, it can be seen that the individual first drive units 031 and the individual second drive units 041 disposed on the first side may be alternately arranged in a pixel column direction Y1 in sequence. The individual first drive units 031 and the individual second drive units 041 disposed on the second side may be alternately arranged in the pixel column direction Y1 in sequence. In this way, it may also facilitate layout and simplify wiring to save manufacturing costs.

In other embodiments, by taking the plurality of adjacent rows of pixels 02 as a group, the individual first drive units 031 coupled with the same group may be arranged on the same side, and the individual first drive units 031 coupled with the adjacent groups may be arranged on the left and right sides, respectively. The layout of the second drive unit 041 is in a similar way. In other words, it is not limited to the layout shown in FIG. 2 based on the arrangement that, among the plurality of first drive units 031 and the plurality of second drive units 041, one part of the drive units is disposed on the first side, and the other part of the drive units is disposed on the second side.

Optionally, referring to FIG. 1 and FIG. 2 above, it can also be seen that, among the plurality of first gating units 032 and the plurality of second gating units 042, the individual gating units disposed on the same side of the substrate 01 may share the same enable line. That is, these gating units are coupled with the same enable line. In this way, the wiring can be further simplified to save costs.

Figure 3:
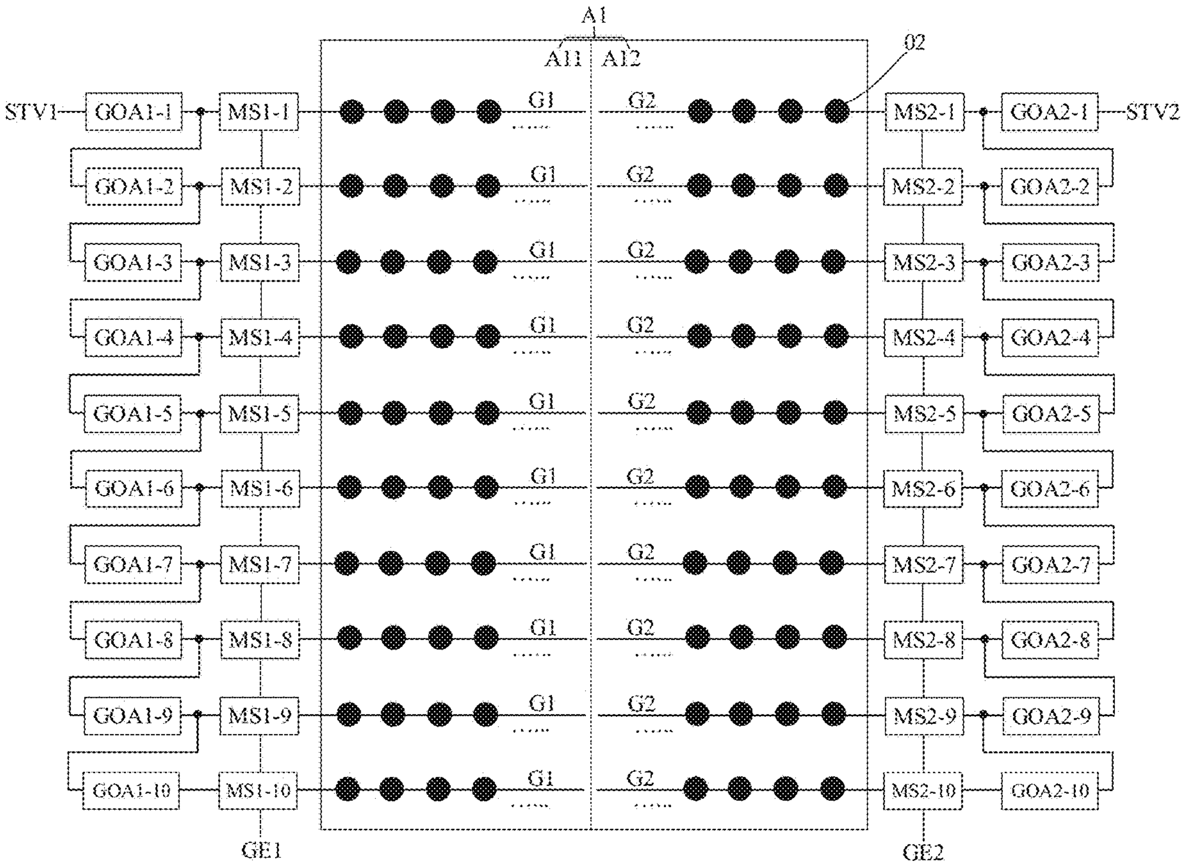
FIG. 3 is a schematic structural diagram of another display panel provided on the basis of FIG. 1 according to some embodiments of the present disclosure.
Figure 4:
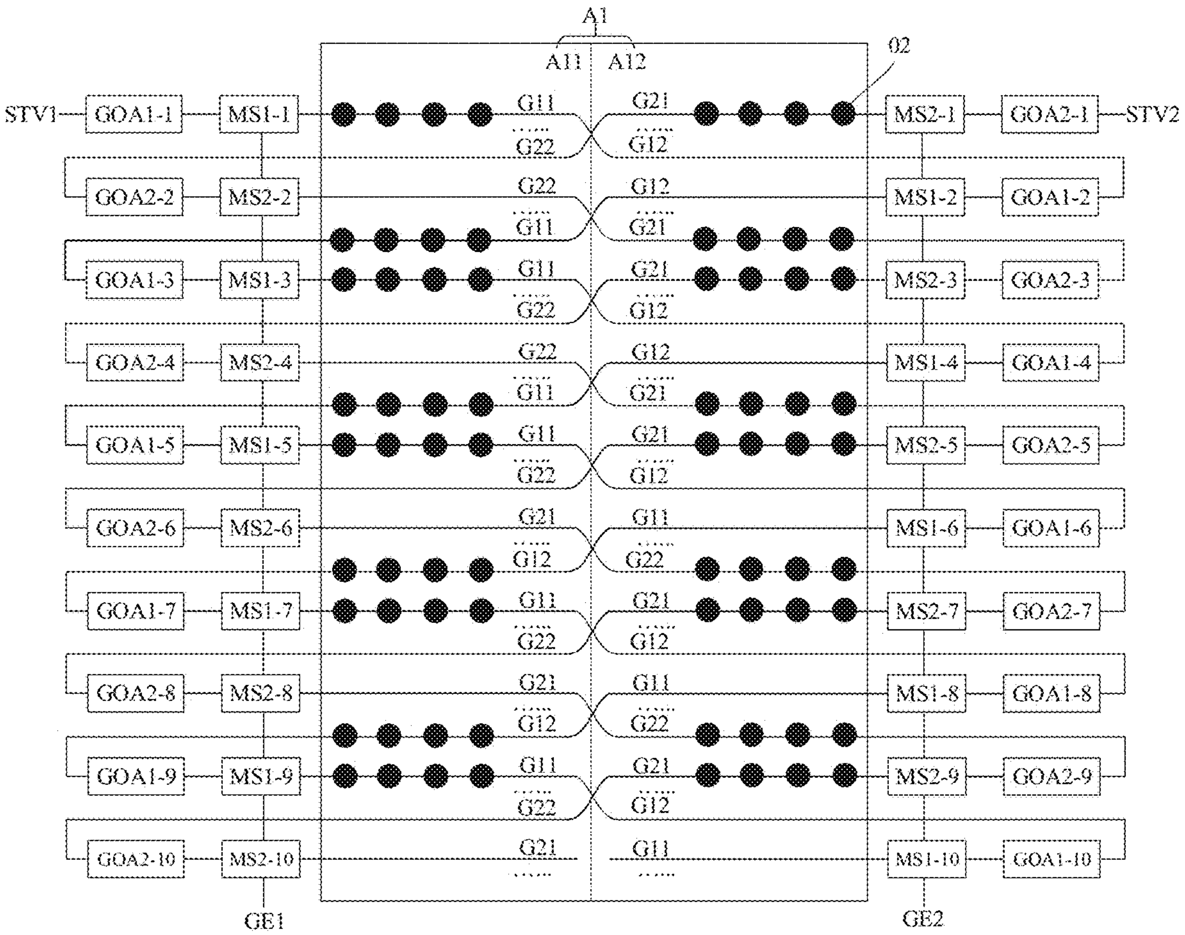
FIG. 4 is a schematic structural diagram of another display panel provided on the basis of FIG. 2 according to some embodiments of the present disclosure.

Optionally, taking the first drive units 031 identified as GOA1*s*, the first gating units 032 identified as MS1*s*, the second drive units 041 identified as GOA2*s*, and the second gating units 042 identified as MS2*s* as an example, FIG. 3 shows the schematic structural diagram of still another display panel on the basis of the structure shown in FIG. 1, and FIG. 4 shows the schematic structural diagram of further another display panel on the basis of the structure shown in FIG. 2. Furthermore, both FIG. 3 and FIG. 4 schematically show 10 first drive units GOA1-1 to GOA1-10 and corresponding 10 first gating units MS1-1 to MS1-10, as well as 10 second drive units GOA2-1 to GOA2-10 and corresponding 10 second gating units MS2-1 to MS2-10.

Referring to FIG. 3 and FIG. 4, it can be seen that each of the first drive units 031 (for example, GOA1-1) may be coupled with a first drive line G1 by a corresponding first gating unit 032 (for example, MS1-1), and the first drive line G1 may be coupled with one part of pixels 02. Each of the second drive units 041 (for example, GOA2-1) may be coupled with a second drive line G2 by a corresponding second gating unit 042 (for example, MS2-1), and the second drive line G2 may be coupled with the other part of the pixels 02. Moreover, the plurality of first drive units 031 may be cascaded by the first drive line G1. The plurality of second drive units 041 may be cascaded by the second drive line G2. Correspondingly, all the individual first drive units 031 may transmit first gate driving signals and cascading signals by the first drive line G1. Similarly, all the individual second drive units 041 may transmit second gate driving signals and cascading signals by the second drive line G2.

Moreover, in an optional embodiment:

referring to FIG. 3, when the plurality of first drive units 031 are all disposed on the first side of the both sides, and the plurality of second drive units 041 are disposed on the second side of the both sides, the first drive line G1 and the second drive line G2 may be independent from each other, i.e., without mutual connection. In other words, the pixels 02 in the same row may be coupled with two of the drive units by the two drive lines.

In another optional embodiment:

referring to FIG. 4, among the plurality of first drive units 031, one part of the first drive units 031 are disposed on a first side of the both sides, and the rest of the first drive units 031 other than the one part of the first drive units 031 are disposed on a second side of the both sides. When, among the plurality of second drive units 041, one part of the second drive units 041 is disposed on the first side of the both sides, and the rest of the second drive units 041 other than the one part of the second drive units 041 are disposed on the second side of the both sides, the first drive line G1, in addition to coupling the pixels 02, may also run through the display region A1 and cascade the first drive units 031 disposed on the first side and the first drive units 031 disposed on the second side. The second drive line G2, in addition to coupling the pixels 02, may also run through the display region A1 and cascade the second drive units 041 disposed on the first side and the second drive units 041 disposed on the second side. Furthermore, the first and second drive lines G1 and G2 coupled with the same row of pixels 02 may be overlapped in the display region A1.

Optionally, one part G11 of the first drive line G1 for coupling the pixels 02 and one part G12 of the first drive line G1 for cascading the first drive units 031 may be disposed on different layers. One part G21 of the second drive line G2 for coupling the pixels 02 and one part G22 of the second drive line G2 for cascading the second drive units 041 may be disposed on different layers. Moreover, the overlapped parts of the first and second drive lines G1 and G2 (see an overlap region C1) may be disposed on different layers.

Figure 5:
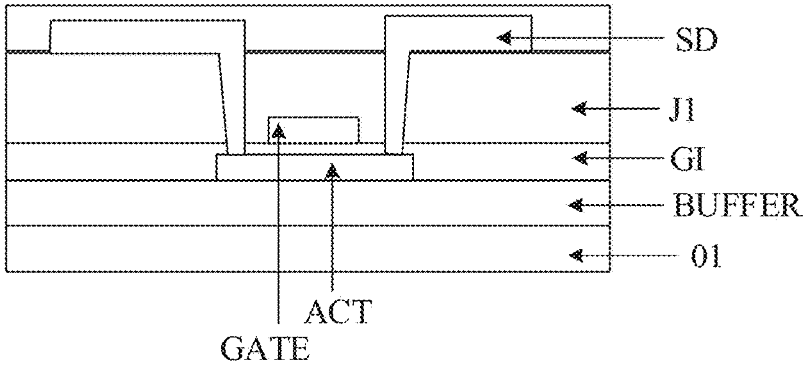
FIG. 5 is a schematic structural diagram of a film layer structure of a pixel according to some embodiments of the present disclosure.

Optionally, first referring to FIG. 5, it can be seen that each of the pixels 02 described in the embodiments of the present disclosure may include: a gate metal layer GATE, an insulation layer J1, and a source-drain metal layer SD, which are sequentially stacked on one side of the substrate 01.

For example, the gate metal layer GATE, the insulation layer J1, and the source-drain metal layer SD shown in FIG. 5 may be sequentially stacked in a direction distal from the substrate 01. Moreover, each of the pixels 02 may also include: a buffer layer BUFFER and an active layer ACT, which are disposed between the substrate 01 and the gate metal layer GATE and are sequentially stacked in the direction distal from the substrate 01. Based on FIG. 5, still referring to the schematic diagram of a partial structure of a display panel shown in FIG. 6, it can be seen that:

in the first drive line G1, the one part G11 for coupling the pixels 02 may be disposed on the same layer as the gate metal layer GATE, the one part G12 for cascading the first drive units 031 may be disposed on the same layer as the source-drain metal layer SD, and the one part G11 for coupling the pixels 02 and the one part G12 for cascading the first drive units 031 may be switched by a via hole (not shown in the figure) running through the insulation layer J1;

and in the second drive line G2, the one part G21 for coupling the pixels 02 may be disposed on the same layer as the gate metal layer GATE, the one part G22 for cascading the second drive units 041 may be disposed on the same layer as the source-drain metal layer SD, and the one part G21 for coupling the pixels 02 and the one part G22 for cascading the second drive units 041 may be switched by a via hole (not shown in the figure) running through the insulation layer J1.

In the overlapping region C1, the first drive line G1 and the second drive line G2 are overlapped, with one disposed on the same layer as the gate metal layer GATE, and the other possibly disposed on the same layer as the source-drain metal layer SD.

That is, based on the layout in FIG. 2, the gate metal layer GATE and the source-drain metal layer SD may be selected for jumpers in the left and right regions of the display region A1. In some embodiments, each of the pixels may include two source-drain metal layers SD1 and SD2, which are sequentially stacked. Correspondingly, the source-drain metal layer SD1 and/or the source-drain metal layer SD2 may also be selected for the jumpers. For example, as described in the above embodiments, the gate metal layer GATE may be selected for the jumper coupled with the pixels 02, and the source-drain metal layer SD1 may be selected for the jumper not coupled with the pixels 02.

It should be noted that being on the same layer may refer to a layer structure in which a film layer for forming a specific pattern may be formed using the same film-forming process, and then, the film layer is patterned using the same mask plate by a one-time patterning process. Depending on the specific pattern, the one-time patterning process may include a plurality of expose, develop, or etch processes, and the specific pattern in the formed layer structure may be continuous or discontinuous. That is, a plurality of elements, components, structures, and/or sections disposed "on the same layer" are constructed of the same material and formed by the same one-time patterning process. In this way, the manufacturing processes and manufacturing costs can be reduced, and the manufacturing efficiency can be increased.

Figure 6:
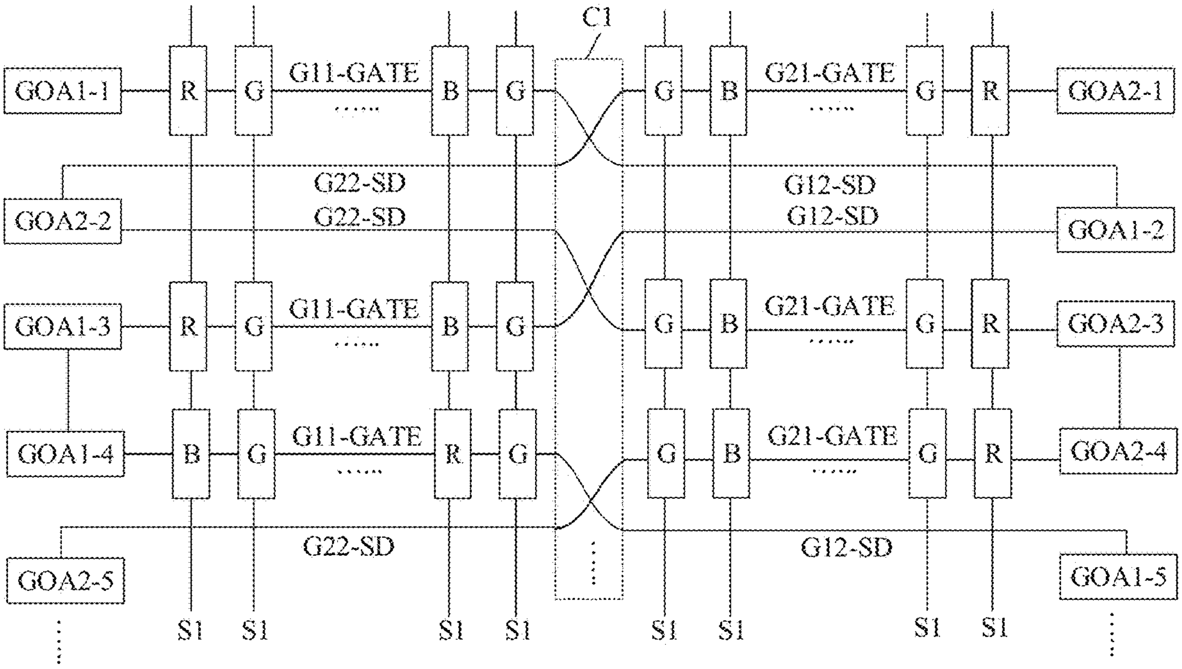
FIG. 6 is a schematic diagram of a partial structure of a display panel provided on the basis of FIG. 4 according to some embodiments of the present disclosure.

Optionally, still referring to FIG. 6, it can be seen that a row of pixels 02 described in the embodiments of the present disclosure may include red (R) pixels 02, green (G) pixels 02, and blue (B) pixels. In addition, in other embodiments, pixels of additional colors may also be included, for example, white pixels.

Optionally, still referring to FIG. 6, it can also be seen that in a pixel column direction Y1, a plurality of columns of pixels 02 described in the embodiments of the present disclosure may also be coupled with a plurality of data lines S1 in one-to-one correspondence, and are configured to receive data signals transmitted from the data lines S1. Each of the pixels 02 may emit light based on the received gate driving signals and data signals.

Figure 7:
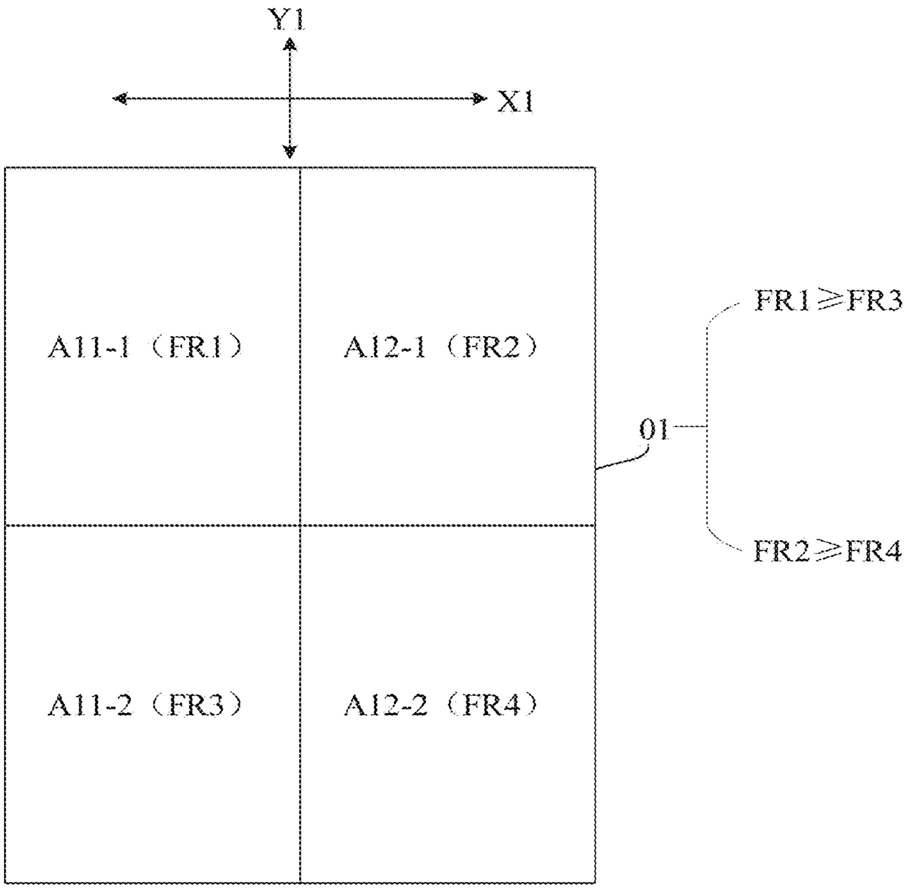
FIG. 7 is a schematic diagram of display region division of a substrate according to some embodiments of the present disclosure.

Optionally, still referring to FIG. 3 and FIG. 4, as well as the schematic diagram of a substrate 01 shown in FIG. 7, it can be seen that the substrate 01 described in the embodiments of the present disclosure may include: a left display region A1*l* and a right display region A12, in both of which a first column of pixels 02 to the last column of pixels 02 are arranged in the pixel row direction X1. The left display region A1*l* may include one part of the pixels 02 in one row of pixels 02, and the right display region A12 may include the other part of the pixels 02 in one row of pixels 02. As described in the above embodiments, one part of the pixels 02 here refers to pixels 02 in one row of pixels 02 coupled with the first drive units 031; and the other part of the pixels 02 refers to pixels 02 in one row of pixels 02 coupled with the second drive units 041. That is, the first drive units 031 may be coupled with the plurality of pixels 02 in the left display region A1*l*, and drive the pixels 02 in the left display region A1*l* to emit light. The second drive units 041 may be coupled with the plurality of pixels 02 in the right display region A12, and drive the pixels 02 in the right display region A12 to emit light. In this way, the left-right frequency division design can be achieved.

Moreover, as described in the above embodiments, still referring to FIG. 7, it can be seen that, based on the division for the left display region A1*l* and the right display region A12, the substrate 01 may further include: an upper display region and a lower display region, in both of which a first row of pixels 02 to the last row of pixels 02 are arranged in the pixel column direction Y1. The upper display region and the lower display region may each include at least one row of pixels 02. Exemplarily, as shown in FIG. 7, the upper display region included in the left display region A1*l* is identified as A11-1, and the lower display region included in the left display region is identified as A11-2. The upper display region included in the right display region A12 is identified as A12-1, and the lower display region included in the right display region is identified as A12-2.

Optionally, based on the layout shown in FIG. 2 and FIG. 4, and considering the reliable cascade transmission of the first drive unit 031 and the second drive unit 041, the embodiments of the present disclosure may also set the frame rate (FR) of the upper display region to be greater than the frame rate of the lower display region.

For example, in FIG. 7, in the left display region A1*l*, the frame rate FR1 of the upper display region A1*l*-1 may be greater than or equal to the frame rate FR3 of the lower display region A1*l*-2; and in the right display region A12, the frame rate FR2 of the upper display region A12-1 may be greater than or equal to the frame rate FR4 of the lower display region A12-2.

In addition, in the left display region A1*l* and the right display region A12, the frame rate FR1 of the upper display region A11-1 and the frame rate FR2 of the upper display region A12-1 may be irrelevant in magnitude. The frame rate FR3 of the lower display region A1*l*-2 and the frame rate FR4 of the lower display region A12-2 may be irrelevant in magnitude.

Optionally, in the embodiments of the present disclosure, combined with FIG. 7, the left display region A1*l* and the right display region A12 may have the same area and the same number of pixels 02 included. And/or, the upper display regions (A11-1 and A12-1) and the lower display regions (A11-2 and A12-2) may have the same area and the same number of pixels 02 included. That is, during frequency-division driving, left and right frequency-division areas may be the same, and/or, upper and lower frequency-division areas may be the same. In this way, uniform frequency-division driving can be achieved to ensure a better display effect.

In addition, in other embodiments, the left and right frequency-division areas may also be different according to customers' needs. For example, the area of the left display region A1*l* may be ⅔ of the overall area of the display region A1; and correspondingly, the area of the right display region A12 may be ⅓ of the overall area of the display region A1. That is, ⅔ frequency division may be set on the left, and ⅓ frequency division may be set on the right. Moreover, the upper and lower frequency-division areas may also be different. In addition, the frame rates for the upper and lower frequency divisions may also be different. For example, the frame rate of the upper display region may be 120 Hz, and the frame rate of the lower display region may be 30 Hz.

Figure 8:
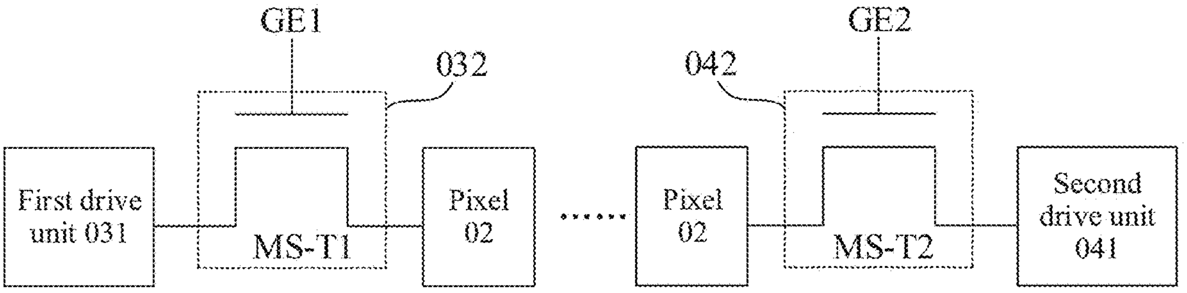
FIG. 8 is a schematic diagram of a circuit structure of a drive unit and a gating unit according to some embodiments of the present disclosure.

Optionally, FIG. 8 is a circuit sketch according to some embodiments of the present disclosure. Referring to FIG. 8, it can be seen that the first gating unit 032 described in the embodiments of the present disclosure may include: a first gating switch tube MS-T1. The second gating unit 042 includes: a second gating switch tube MS-T2.

A gate of the first gating switch tube MS-T1 may be coupled with the first enable line GE1, a first electrode of the first gating switch tube MS-T1 may be coupled with the corresponding first drive unit 031, and a second electrode of the first gating switch tube MS-T1 may be coupled with one part of pixels 02. The first gating switch tube MS-T1 may be configured to be turned on when the potential of the first enable signal provided by the first enable line GE1 is the first potential, such that the first drive unit 031 and the pixels 02 are connected, and then the first drive unit 031 transmits the first gate driving signal to the pixels 02. Moreover, the first gating switch tube MS-T1 may be configured to be turned off when the potential of the first enable signal provided by the first enable line GE1 is the second potential, such that the first drive unit 031 and the pixels 02 are uncoupled.

A gate of the second gating switch tube MS-T2 may be coupled with the second enable line GE2, a first electrode of the second gating switch tube MS-T2 may be coupled with the corresponding second drive unit 041, and a second electrode of the second gating switch tube MS-T2 may be coupled with the other part of the pixels 02. The second gating switch tube MS-T2 may be configured to be turned on when the potential of the second enable signal provided by the second enable line GE2 is the first potential, such that the second drive unit 041 and the pixels 02 are connected, and then the second drive unit 041 transmits the second gate driving signal to the pixels 02. Moreover, the second gating switch tube MS-T2 may be configured to be turned off when the potential of the second enable signal provided by the second enable line GE2 is the second potential, such that the second drive unit 041 and the pixels 02 are uncoupled.

Figure 9:
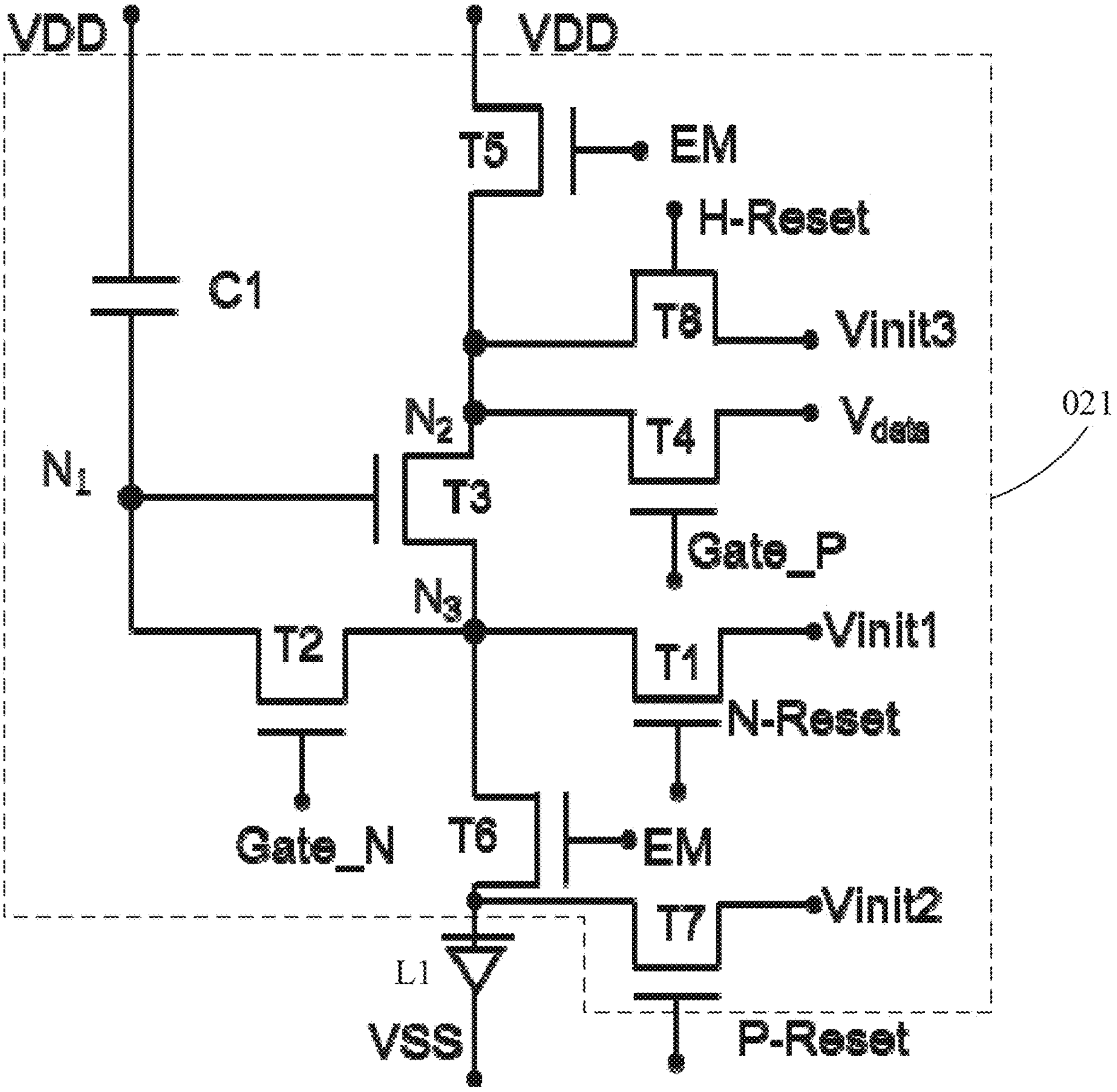
FIG. 9 is a schematic diagram of a circuit structure of a pixel according to some embodiments of the present disclosure.

Optionally, the display panel described in the embodiments of the present disclosure may include the LTPO display panel described in the above embodiments. Exemplarily, taking the LTPO display panel as an example, FIG. 9 shows a schematic structural diagram of a pixel included in the LTPO display panel. As shown in FIG. 9, the pixel 02 may include a pixel circuit 021 and a light-emitting element L1. Furthermore, the pixel circuit 021 may be an 8T1C structure, i.e., including eight transistors T1 to T8 and one capacitor C1.

A gate of the transistor T1 may be coupled with a reset terminal N-Reset, a first electrode of the transistor T1 may be coupled with a first initial terminal Vinit1, and a second electrode of the transistor T1 may be coupled with a node N3. The transistor T1 may be configured to be turned on when the potential of a reset signal provided by the reset terminal N-Reset is a first potential, such that the first initial terminal Vinit1 and the node N3 are connected, and then a first initial signal provided by the first initial terminal Vinit1 may be transmitted to the node N3 to allow the reset of the node N3. Moreover, the transistor T1 may be configured to be turned off when the potential of the reset signal provided by the reset terminal N-Reset is a second potential, such that the first initial side Vinit1 and the node N3 are uncoupled.

A gate of the transistor T2 may be coupled with a gate signal terminal Gate_N, a first electrode of the transistor T2 may be coupled with the node N3, and a second electrode of the transistor T2 may be coupled with a node N1. The transistor T2 may be configured to be turned on when the potential of a gate driving signal provided by the gate signal terminal Gate_N is the first potential, such that the node N1 and the node N3 are connected. Moreover, the transistor T2 is configured to be turned off when the potential of the gate driving signal provided by the gate signal terminal Gate_N is the second potential, such that the node N1 and the node N3 are uncoupled.

A gate of the transistor T3 may be coupled with the node N1, a first electrode of the transistor T3 may be coupled with a node N2, and a second electrode of the transistor T3 may be coupled with the node N3. The transistor T3 may be configured to transmit a light-emitting drive signal to the node N3 based on the potential of the node N1 and the potential of the node N2. The transistor T3 may also be called a drive transistor.

A gate of the transistor T4 may be coupled with the gate signal terminal Gate_N, a first electrode of the transistor T4 may be coupled with a data signal terminal Vdata, and a second electrode of the transistor T4 may be coupled with the node N2. The transistor T4 may be configured to be turned on when the potential of the gate driving signal provided by the gate signal terminal Gate_P is the first potential, such that the data signal terminal Vdata and the node N2 are connected, and then a data signal provided by the data signal terminal Vdata may be transmitted to the node N2. On the basis that both the transistors T2 and T3 are turned on, the data signal transmitted to the node N2 may be further written into the node N1 via the transistors T3 and T2. Moreover, the transistor T4 may be configured to be turned off when the potential of the gate driving signal provided by the gate signal terminal Gate_P is the second potential, such that the data signal terminal Vdata and the node N2 are uncoupled.

A gate of the transistor T5 may be coupled with a light-emitting control terminal EM, a first electrode of the transistor T5 may be coupled with a drive power terminal VDD, and a second electrode of the transistor T5 may be coupled with the node N2. The transistor T5 may be configured to be turned on when the potential of a light-emitting control signal provided by the light-emitting control terminal EM is the first potential, such that the drive power terminal VDD and the node N2 are connected, and then a drive power signal provided by the drive power terminal VDD may be transmitted to the node N2. Moreover, the transistor T5 may be configured to be turned off when the potential of the light-emitting control signal provided by the light-emitting control terminal EM is the second potential, such that the drive power terminal VDD and the node N2 are uncoupled.

A gate of the transistor T6 may be coupled with the light-emitting control terminal EM, a first electrode of the transistor T6 may be coupled with a node N3, and a second electrode of the transistor T6 may be coupled with a first electrode of a light-emitting element L1. The transistor T6 may be configured to be turned on when the potential of the light-emitting control signal provided by the light-emitting control terminal EM is the first potential, such that the node N3 and the first electrode of the light-emitting element L1 are connected, and then a signal (for example, the light-emitting drive signal) transmitted to the node N3 may be transmitted to the first electrode of the light-emitting element L1. Moreover, the transistor T6 may be configured to be turned off when the potential of the light-emitting control signal provided by the light-emitting control terminal EM is the second potential, such that the node N3 and the first electrode of the light-emitting element L1 are uncoupled. In addition, a second electrode of the light-emitting element L1 may also be coupled with a pull-down power terminal VSS, and the light-emitting element L1 may emit light under the effect of a voltage difference between the signal received by the first electrode of the light-emitting element L1 and a pull-down power signal provided by the pull-down power terminal VSS coupled with the second electrode of the light-emitting element L1.

Optionally, for the first and second electrodes of the light-emitting element L1, one electrode may be an anode, and the other electrode may be a cathode. For example, referring to FIG. 9, it shows that the first electrode is the anode and the second electrode is the cathode.

A gate of the transistor T7 may be coupled with a reset terminal P-Reset, a first electrode of the transistor T7 may be coupled with a second initial terminal Vinit2, and a second electrode of the transistor T7 may be coupled with the first electrode of the light-emitting element L1. The transistor T7 may be configured to be turned on when the potential of a reset signal provided by the reset terminal P-Reset is the first potential, such that the second initial terminal Vinit2 and the first electrode of the light-emitting element L1 are connected, and then a second initial signal provided by the second initial-terminal Vinit2 may be transmitted to the first electrode of the light-emitting element L1 to allow the reset of the first electrode of the light-emitting element L1. Moreover, the transistor T7 may be configured to be turned off when the potential of the reset signal provided by the reset terminal P-Reset is the second potential, such that the second initial terminal Vinit2 and the first electrode of the light-emitting element L1 are uncoupled.

A gate of the transistor T8 may be coupled with a reset terminal H-Reset, a first electrode of the transistor T8 may be coupled with a third initial terminal Vinit3, and a second electrode of the transistor T8 may be coupled with the node N2. The transistor T8 may be configured to be turned on when the potential of a reset signal provided by the reset terminal H-Reset is the first potential, such that the third initial terminal Vinit3 and the node N2 are connected, and then a third initial signal provided by the third initial terminal Vinit3 may be transmitted to the node N2 to allow the reset of the node N2. Moreover, the transistor T8 may be configured to be turned off when the potential of the reset signal provided by the reset terminal H-Reset is the second potential, such that the third initial terminal Vinit3 and the node N2 are uncoupled.

One terminal of the capacitor C1 may be coupled with the node N1, and the other terminal of the capacitor C1 may be coupled with the drive power terminal VDD. The capacitor C1 may be configured to store the potential of the node N1 based on the drive power signal provided by the drive power terminal VDD.

Furthermore, the transistor T2 coupled with the gate signal terminal Gate_N may be an N-type transistor made of an oxide material; and the transistor T4 coupled with the gate signal terminal Gate_P may be a P-type transistor made of low temperature poly-silicon (LTPS). In this way, the display panel is called the LTPO panel. It should be noted that the material of the transistor here may refer to: the material of an active layer included in the transistor.

Moreover, combined with FIGS. 3 and 4 above, the first drive line G1 and the second drive line G2 may both be coupled with the gate signal terminal Gate_N coupled with the transistor T2 included in the pixel circuit 021 in the pixel 02. Correspondingly, both the first turn-on line STV1 and the second turn-on line STV2 may be identified as NSTV. Here, N represents an N-type transistor, correspondingly representing embodiments where the first potential is a high potential and the second potential is a low potential. In addition, in some embodiments, it is not limited to coupling of the gate signal terminal Gate_N. For example, the first drive line G1 and the second drive line G2 may also be coupled with the gate signal terminal Gate_P coupled with the transistor T4 included in the pixel circuit 02. That is, the first drive unit 031 and the second drive unit 041 may act only on the transistor T2, or may act on the transistor T2 and transistor T4 together. In addition, the data lines S1 may all be coupled with the data signal terminal Vdata coupled with the transistor T4 included in the pixel circuit 021 in the pixel 02.

It should be noted that the pixel circuit 021 may be not limited to the 8T1C structure shown in FIG. 9. For example, in other embodiments, the pixel circuit 021 may be a 7T1C structure without the transistor T8.

In summary, the embodiments of the present disclosure provide a display panel. The display panel includes a substrate having a display region and a peripheral region, a plurality of pixels disposed in the display region, and a first drive circuit and a second drive circuit, which are disposed in the peripheral region. The first drive circuit includes a plurality of first drive units and a plurality of first gating units, in one-to-one correspondence. The second drive circuit includes a plurality of second drive units and a plurality of second gating units, in one-to-one correspondence. The plurality of first drive units are cascaded, are coupled with a first turn-on line, and are also coupled with one part of pixels in a row of pixels by a corresponding first gating unit. The plurality of second drive units are cascaded, are coupled with a second turn-on line, and are also coupled with the other part of the pixels in the row of pixels by a corresponding second gating unit. The first gating units are also coupled with a first enable line. The second gating units are also coupled with a second enable line. The plurality of first drive units may output first gate driving signals based on a first turn-on signal provided by a first turn-on line. The plurality of second drive units may output second gate driving signals based on a second turn-on signal provided by a second turn-on line. The first gating units may control on-off between the corresponding first drive units and one part of pixels based on a first enable signal provided by the first enable line. The second gating units may control on-off between the corresponding second drive units and the other part of pixels based on a second enable signal provided by the second enable line. In this way, the pixels in different regions (the upper, lower, left or right region) of the display region can be flexibly refreshed by flexibly setting the enable signals and the turn-on signals, and the frame rates for different regions can be different, such that partial update can be achieved, thereby reducing power consumption and achieving a high intelligence level.

Figure 10:
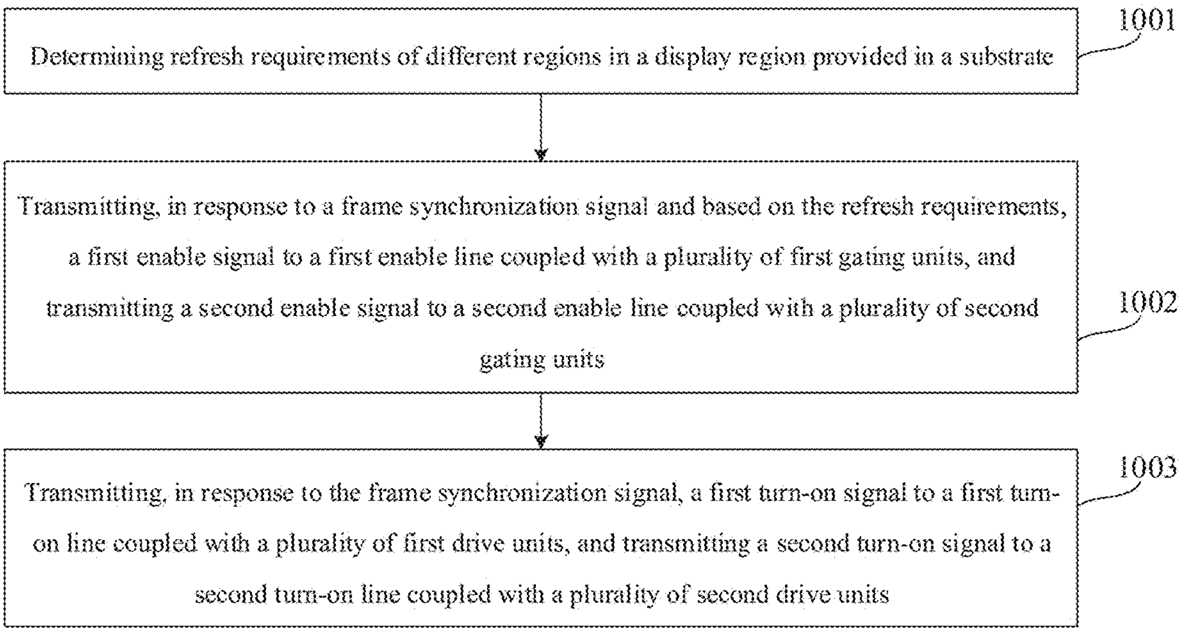
FIG. 10 is a flowchart of a method for display control according to some embodiments of the present disclosure.

FIG. 10 is a flowchart of a method for display control according to some embodiments of the present disclosure. The method may be configured for controlling the display panel as described in the above embodiments. As shown in FIG. 10, the method includes the following steps.

In step 1001, refresh requirements of different regions in a display region provided in a substrate are determined.

In the embodiments of the present disclosure, the different regions include a left region and a right region, which are arranged along the pixel row direction X1, and/or, an upper region and a lower region, which are arranged along the pixel column direction Y1, and the refresh requirements may be configured to indicate whether refresh is required and a refresh frequency. Exemplarily, combined with FIG. 7, the left region may refer to the left display region A1*l*, and the right region may refer to the right display region A12. Further, the upper region may refer to the upper display regions A11-1 and A12-1, and the lower region may refer to the lower display regions A11-2 and A12-2.

Optionally, the method for display control as described in the embodiments of the present disclosure is applicable to a driver chip, also known as a driver integrated circuit (DIC), included in the display device.

The DIC may be coupled with a host-side access point (AP). The DIC may directly determine the refresh requirements, i.e., determining the positions of the left and right regions to be refreshed and the positions of the upper and lower regions to be refreshed in the display region; or, the DIC may also receive data signals from the AP, and then determine the refresh requirements by comparing a data signal received in real time with a data signal of a previous frame.

In step 1002, in response to a frame synchronization signal and based on the refresh requirements, a first enable signal is transmitted to a first enable line coupled with a plurality of first gating units, and a second enable signal is transmitted to a second enable line coupled with a plurality of second gating units.

The first enable signal of a first potential may be configured to indicate the first gating units to control the corresponding first drive units and the one part of the pixels coupled with the first drive units to be connected; and the first enable signal of a second potential may be configured to indicate the first gating units to control the corresponding first drive units and the one part of the pixels coupled with the first drive units to be uncoupled.

Similarly, the second enable signal of a first potential may be configured to indicate the second gating units to control the corresponding second drive units and another part of the pixels coupled with the second drive units to be connected; and the second enable signal of a second potential may be configured to indicate the second gating units to control the corresponding second drive units and another part of the pixels coupled with the second drive units to be uncoupled.

Optionally, after determining the refresh requirements, the DIC may further generate the first and second enable signals based on the refresh requirements in response to the frame synchronization signal Vsync, and output the first and second enable signals to the first enable line GE1 and the second enable line GE2, respectively. The frame synchronization signal Vsync is configured to indicate the start of the scanning of a single frame.

In step 1003, in response to the frame synchronization signal, a first turn-on signal is transmitted to a first turn-on line coupled with a plurality of first drive units, and a second turn-on signal is transmitted to a second turn-on line coupled with a plurality of second drive units.

The first turn-on signal may be configured to indicate the plurality of drive units to output first gate driving signals, and the second turn-on signal is configured to indicate the plurality of second drive units to output second gate driving signals.

Optionally, the DIC may also generate the first and second turn-on signals in response to the frame synchronization signal Vsync, and transmit the first and second turn-on signals to the first turn-on line STV1 and the second turn-on line STV2, respectively.

In the embodiments of the present disclosure, when the first gating units control the first drive units and the one part of the pixels coupled with the first drive units to be connected, the first drive units may transmit the first gate driving signals to the one part of the pixels, to drive the one part of the pixels to emit light. When the second gating units control the second drive units and the another part of the pixels coupled with the second drive units to be connected, the second drive units transmit the second gate driving signals to the another part of the pixels, to drive the another part of the pixels to emit light.

Figure 11:
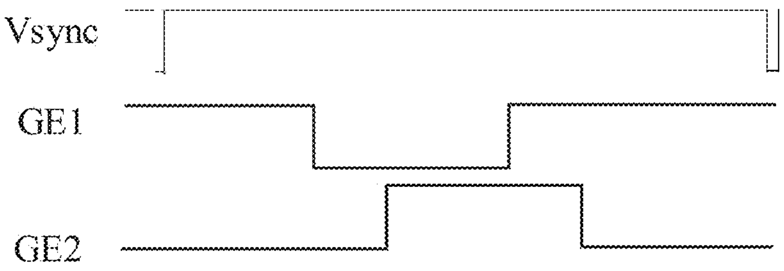
FIG. 11 is a signal timing diagram provided on the basis of the structure in FIG. 1 according to some embodiments of the present disclosure.
Figure 12:
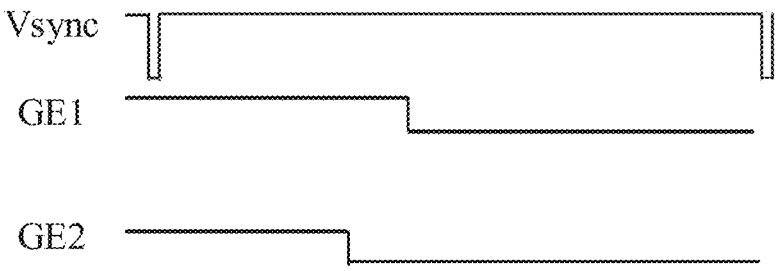
FIG. 12 is a signal timing diagram provided on the basis of the structure in FIG. 2 according to some embodiments of the present disclosure.

Optionally, taking the first potential of a high potential and the second potential of a low potential as an example, FIG. 11 shows a timing diagram on the basis of the structures shown in FIGS. 1 and 3; and FIG. 12 shows another timing diagram on the basis of the structures shown in FIGS. 2 and 4. Referring to FIGS. 11 and 12, it can be seen that after the frame synchronization signal Vsync arrives, the first enable signal provided by the first enable line GE1 may be pulled down or up at any row, and the second enable signal provided by the second enable line GE2 may be pulled down or up at any row.

The first enable signal is pulled up, such that when the potential of the first enable signal is high, the first gating units 032 may control, based on the first enable signal of the high potential, the first drive units 031 and one part of pixels 02 coupled with the first drive units to be connected, making the first drive units 031 transmit the first gate driving signals to the one part of the pixels 02, thereby refreshing and scanning the one part of the pixels 02. The first enable signal is pulled down, such that when the potential of the first enable signal is low, the first gating units 032 may control, based on the first enable signal of the low potential, the first drive units 031 and the one part of the pixels 02 coupled with the first drive units to be uncoupled, making the first drive units 031 fail to transmit the first gate driving signals to the one part of the pixels 02, thereby not refreshing and scanning the one part of the pixels 02, which may be maintained in the state of the latest frame.

The second enable signal works in a similar way, where the second enable signal is pulled up, such that when the potential of the second enable signal is high, the second gating units 042 may control, based on the second enable signal of the high potential, the second drive units 041 and the other part of the pixels 02 coupled with the second drive units to be connected, making the second drive units 041 transmit the first gate driving signals to the other part of the pixels 02, thereby refreshing and scanning the other part of the pixels 02. The second enable signal is pulled down, such that when the potential of the second enable signal is low, the second gating units 042 may control, based on the second enable signal of the low potential, the second drive units 041 and the other part of the pixels 02 coupled with the second drive units to be uncoupled, making the second drive units 041 fail to transmit the first gate driving signals to the other part of the pixels 02, thereby not refreshing and scanning the other part of the pixels 02, which may be maintained in the state of the latest frame.

As a result, the positions of different regions (upper, lower, left, and right regions) in the display region can be intelligently refreshed by flexibly setting the first and second enable signals, thereby achieving frequency-division drive.

In summary, the embodiments of the present disclosure provide a method for display control. In the method, the plurality of first drive units can output first gate driving signals based on a first turn-on signal provided by a first turn-on line. The plurality of second drive units can output second gate driving signals based on a second turn-on signal provided by a second turn-on line. The first gating units can control on-off between the corresponding first drive units and one part of pixels based on a first enable signal provided by the first enable line. The second gating units can control on-off between the corresponding second drive units and the other part of pixels based on a second enable signal provided by the second enable line. In this way, the pixels in different regions (the upper, lower, left or right region) of the display region can be flexibly refreshed by flexibly setting the enable signals and the turn-on signals, and the frame rates for different regions can be different, such that partial update can be achieved, thereby reducing power consumption to achieve the purpose of intelligence and power saving.

Figure 13:
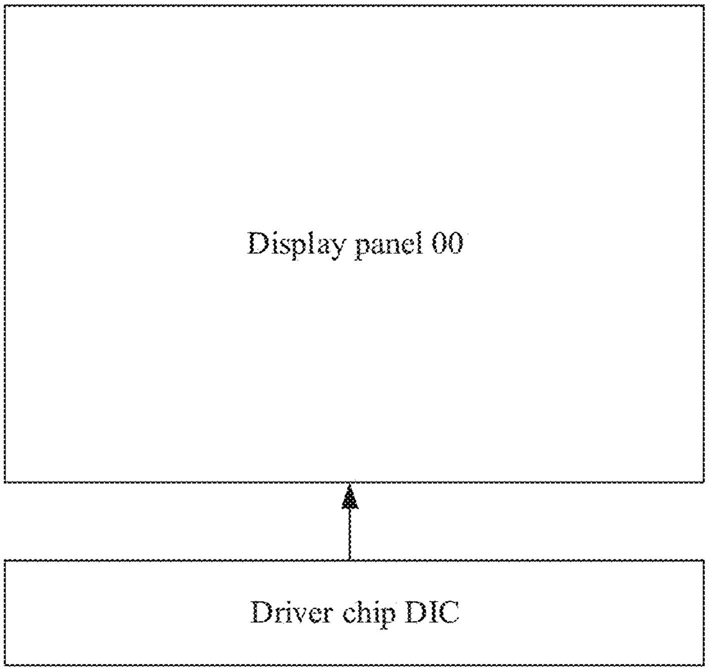
FIG. 13 is a schematic structural diagram of a display device according to some embodiments of the present disclosure.

FIG. 13 is a schematic structural diagram of a display device according to some embodiments of the present disclosure. As shown in FIG. 13, the display device includes a driver chip DIC, and the display panel 00 described as in the above embodiments.

The driver chip DIC is coupled with a signal line coupled with a circuit in the display panel 00 and is configured to provide a signal to the signal line.

For example, the driver chip DIC may be coupled with the first turn-on line STV1 coupled with the first drive units 031 included in the first drive circuit 03, with the first enable line GE1 coupled with the first gating units 032 included in the first drive circuit 03, with the second turn-on line STV2 coupled with the second drive units 041 included in the second drive circuit 04, and with the second enable line GE2 coupled with the second gating units 042 included in the second drive circuit 04, in the display region 00. The driver chip DIC is configured to provide a first turn-on signal to the first turn-on line STV1, a second turn-on signal to the second turn-on line STV2, a first enable signal to the first enable line GE1, and a second enable signal to the second enable line GE2.

Optionally, the display device described in the embodiments of the present disclosure may be a mobile phone (for example, a foldable mobile phone available for left-right screen splitting), a tablet computer, a flexible display device, a television set, a display, or any other products or components having a display function. Taking a mobile phone as the display device as an example, the solutions described in the embodiments of the present disclosure may also enable the mobile phone to allow the design of left-right screen splitting while rotating, showing high drive flexibility.

It should be noted that the terms used in the embodiments of the present disclosure are to explain the embodiments of the present disclosure, and are not intended to limit the present disclosure. Unless otherwise defined, the technical terms or scientific terms used in the embodiments of the present disclosure should be taken to mean the ordinary meanings as understood by those of ordinary skills in the art to which the present disclosure belongs.

For example, in the embodiments of the present disclosure, the terms "first" and "second" are only for a descriptive purpose and should not be understood as indicating or implying relative importance. The term "a plurality of" means two or more in number, unless otherwise expressly defined.

Similarly, "a," "an" or similar words are also not intended to limit the number, but to denote the number of at least one.

"Connection" or "coupling" refers to an electrical connection. "And/or" indicates the presence of three types of possible relationships. For example, A and/or B may indicate the following three cases: A exists alone; both A and B exist; or B exists alone. The character "/" generally indicates an "or" relation between front and back associated objects.

The terms "comprise," "include," or the like are intended to mean that elements or objects appearing before said term cover elements or objects or equivalents listed after said term, but do not exclude other elements or objects.

"Upper," "lower," "left," "right," and the like are only intended to indicate a relative positional relationship, and when the absolute position of a described object changes, the relative positional relationship thereof may also change accordingly.

Described above are merely optional embodiments of the present disclosure, but are not intended to limit the present disclosure. Any modifications, equivalent replacements, improvements, and the like made within the spirit and principles of the present disclosure should be included within the scope of protection of the present disclosure.

What is claimed is:

1. A display panel, comprising:

a substrate having a display region and a peripheral region at least partially surrounding the display region;

a plurality of pixels arranged in an array and disposed in the display region;

a first drive circuit disposed in the peripheral region, the first drive circuit comprising: a plurality of first drive units cascaded, and a plurality of first gating units in one-to-one correspondence with the plurality of first drive units;

a second drive circuit disposed in the peripheral region, the second drive circuit comprising:

a plurality of second drive units cascaded, and a plurality of second gating units in one-to-one correspondence with the plurality of second drive units, wherein at least one of the first drive units and at least one of the second drive unit are respectively disposed on both sides of the substrate in a pixel row direction, each of the first gating units and a corresponding first drive unit are disposed on a same side of the substrate, and each of the second gating units and a corresponding second drive unit are disposed on a same side of the substrate; among the plurality of first drive units, one part of the first drive units are disposed on a first side of the both sides, and a rest of the first drive units other than the one part of the first drive units are disposed on a second side of the both sides; and among the plurality of second drive units, one part of the second drive units are disposed on the first side of the both sides, and a rest of the second drive units other than the one part of the second drive units are disposed on the second side of the both sides;

each of the first drive units is coupled with one part of pixels in at least one row of pixels by a corresponding first gating unit, which is also coupled with a first enable line and is configured to control on-off between the first drive unit and the one part of the pixels based on a first enable signal provided by the first enable line; and the plurality of first drive units are also coupled with a first turn-on line and are configured to output first gate driving signals based on a first turn-on signal provided by the first turn-on line; and each of the second drive units is coupled with another part of the pixels in the at least one row of pixels by a corresponding second gating unit, which is also coupled with a second enable line and is configured to control on-off between the second drive unit and the another part of the pixels based on a second enable signal provided by the second enable line; and the plurality of second drive units are also coupled with a second turn-on line and are configured to output second gate driving signals based on a second turn-on signal provided by the second turn-on line.

2. The display panel according to claim 1, wherein each of the first drive units is coupled with one part of pixels in a row of pixels by a corresponding first gating unit; and among the plurality of first drive units, individual first drive units coupled with even-numbered rows of pixels are disposed on the first side, and individual first drive units coupled with odd-numbered rows of pixels are disposed on the second side.

3. The display panel according to claim 1, wherein each of the second drive units is coupled with another part of pixels in a row of pixels by a corresponding second gating unit; and among the plurality of second drive units, individual second drive units coupled with even-numbered rows of pixels are disposed on the first side, and individual second drive units coupled with odd-numbered rows of pixels are disposed on the second side.

4. The display panel according to claim 3, wherein the individual first and second drive units disposed on the first side are alternately arranged in a pixel column direction in sequence; and the individual second and first drive units disposed on the second side are alternately arranged in the pixel column direction in sequence.

5. The display panel according to claim 1, wherein each of the first drive units is coupled with a first drive line by a corresponding first gating unit, and the first drive line is coupled with the one part of the pixels; each of the second drive units is coupled with a second drive line by a corresponding second gating unit, and the second drive line is coupled with another part of the pixels; and the plurality of first drive units are cascaded by the first drive line, and the plurality of second drive units are cascaded by the second drive line.

6. The display panel according to claim 5, wherein in a case that the plurality of first drive units are disposed on the first side of the both sides and the plurality of second drive units are disposed on the second side of the both sides, the first drive line and the second drive line are independent from each other.

7. The display panel according to claim 5, wherein in a case that among the plurality of first drive units, one part of the first drive units are disposed on a first side of the both sides, and a rest of the first drive units other than the one part of the first drive units are disposed on a second side of the both sides; and among the plurality of second drive units, one part of the second drive units are disposed on the first side of the both sides, and a rest of the second drive units other than the one part of the second drive units are disposed on the second side of the both sides:

the first drive line, in addition to coupling the pixels, also runs through the display region, and cascades the first drive units disposed on the first side and the first drive units disposed on the second side;

the second drive line, in addition to coupling the pixels, also runs through the display region, and cascades the second drive units disposed on the first side and the second drive units disposed on the second side; and the first and second drive lines coupled with a same row of pixels are overlapped in the display region.

8. The display panel according to claim 7, wherein one part of the first drive line for coupling pixels and one part of the first drive line for cascading the first drive units are disposed on different layers; one part of the second drive line for coupling pixels and one part of the second drive line for cascading the second drive units are disposed on different layers; and overlapped parts of the first and second drive lines are disposed on different layers.

9. The display panel according to claim 8, wherein each of the pixels comprises:

a gate metal layer, an insulation layer, and a source-drain metal layer, which are sequentially stacked on one side of the substrate;

wherein in the first drive line, the one part for coupling the pixels is disposed on a same layer as the gate metal layer, the one part for cascading the first drive units is disposed on a same layer as the source-drain metal layer, and the one part for coupling the pixels and the one part for cascading the first drive units are switched by a via hole running through the insulation layer; and in the second drive line, the one part for coupling the pixels is disposed on a same layer as the gate metal layer, the one part for cascading the second drive units is disposed on a same layer as the source-drain metal layer, and the one part for coupling the pixels and the one part for cascading the second drive units are switched by a via hole running through the insulation layer.

10. The display panel according to claim 1, wherein the substrate comprises:

a left display region and a right display region, which are arranged along the pixel row direction from a first column of pixels to a last column of pixels, the left display region comprising the one part of the pixels, and the right display region comprising the another part of the pixels; and an upper display region and a lower display region, which are arranged along a pixel column direction from a first row of pixels to a last row of pixels, the upper display region and the lower display region each comprising at least one row of pixels.

11. The display panel according to claim 10, wherein a frame rate of the upper display region is greater than or equal to a frame rate of the lower display region.

12. The display panel according to claim 10, wherein the left display region and the right display region have a same area and comprise a same number of pixels;

and/or, the upper display region and the lower display region have a same area and comprise a same number of pixels.

13. The display panel according to claim 1, wherein among the plurality of first gating units and the plurality of second gating units, individual gating units disposed on a same side of the substrate share a same enable line.

14. The display panel according to claim 1, wherein each of the first gating units comprises: a first gating switch tube; and each of the second gating units comprises:

a second gating switch tube;

wherein a gate of the first gating switch tube is coupled with the first enable line, a first electrode of the first gating switch tube is coupled with a corresponding first drive unit, and a second electrode of the first gating switch tube is coupled with the one part of the pixels; and a gate of the second gating switch tube is coupled with the second enable line, a first electrode of the second gating switch tube is coupled with a corresponding second drive unit, and a second electrode of the second gating switch tube is coupled with the another part of the pixels.

15. The display panel according to claim 1, wherein each of the first drive units is coupled, by the corresponding first gating unit, with one part of the pixels in the at least one row of pixels adjacent to the first gating unit; each of the second drive units is coupled, by the corresponding second gating unit, with the another part of the pixels in the at least one row of pixels adjacent to the second gating unit; and individual pixels in the one part of the pixels are adjacent to each other, and individual pixels in the another part of the pixels are adjacent to each other.

16. The display panel according to claim 1, wherein the display panel comprises: a low temperature polycrystalline oxide (LTPO) display panel.

17. A method for display control for controlling the display panel as defined in claim 1, comprising:

determining refresh requirements of different regions in the display region provided in the substrate, wherein the different regions comprise a left region and a right region, which are arranged along the pixel row direction, and/or an upper region and a lower region, which are arranged along a pixel column direction, and the refresh requirements are configured to indicate whether refresh is required and a refresh frequency;

transmitting, in response to a frame synchronization signal and based on the refresh requirements, the first enable signal to the first enable line coupled with the plurality of first gating units, and transmitting the second enable signal to the second enable line coupled with the plurality of second gating units, wherein the first enable signal of a first potential is configured to indicate the first gating units to control the corresponding first drive units and the one part of the pixels coupled with the first drive units to be connected, the first enable signal of a second potential is configured to indicate the first gating units to control the corresponding first drive units and the one part of the pixels coupled with the first drive units to be uncoupled, the second enable signal of a first potential is configured to indicate the second gating units to control the corresponding second drive units and the another part of the pixels coupled with the second drive units to be connected, and the second enable signal of a second potential is configured to indicate the second gating units to control the corresponding second drive units and the another part of the pixels coupled with the second drive units to be uncoupled; and transmitting, in response to the frame synchronization signal, the first turn-on signal to the first turn-on line coupled with the plurality of first drive units, and transmitting the second turn-on signal to the second turn-on line coupled with the plurality of second drive units, wherein the first turn-on signal is configured to indicate the plurality of drive units to output first gate driving signals, and the second turn-on signal is configured to indicate the plurality of second drive units to output second gate driving signals, wherein in a case that the first gating units control the first drive units and the one part of the pixels coupled with the first drive units to be connected, the first drive units transmit the first gate driving signals to the one part of the pixels; and in a case that the second gating units control the second drive units and the another part of the pixels coupled with the second drive units to be connected, the second drive units transmit the second gate driving signals to the another part of the pixels.

18. A display device, comprising: a driver chip, and a display panel comprising:

a substrate having a display region and a peripheral region at least partially surrounding the display region;

a plurality of pixels arranged in an array and disposed in the display region;

a first drive circuit disposed in the peripheral region, the first drive circuit comprising: a plurality of first drive units cascaded, and a plurality of first gating units in one-to-one correspondence with the plurality of first drive units;

a second drive circuit disposed in the peripheral region, the second drive circuit comprising:

a plurality of second drive units cascaded, and a plurality of second gating units in one-to-one correspondence with the plurality of second drive units, wherein at least one of the first drive units and at least one of the second drive unit are respectively disposed on both sides of the substrate in a pixel row direction, each of the first gating units and a corresponding first drive unit are disposed on a same side of the substrate, and each of the second gating units and a corresponding second drive unit are disposed on a same side of the substrate; among the plurality of first drive units, one part of the first drive units are disposed on a first side of the both sides, and a rest of the first drive units other than the one part of the first drive units are disposed on a second side of the both sides; and among the plurality of second drive units, one part of the second drive units are disposed on the first side of the both sides, and a rest of the second drive units other than the one part of the second drive units are disposed on the second side of the both sides; each of the first drive units is coupled with one part of pixels in at least one row of pixels by a corresponding first gating unit, which is also coupled with a first enable line and is configured to control on-off between the first drive unit and the one part of the pixels based on a first enable signal provided by the first enable line; and the plurality of first drive units are also coupled with a first turn-on line and are configured to output first gate driving signals based on a first turn-on signal provided by the first turn-on line; and each of the second drive units is coupled with another part of the pixels in the at least one row of pixels by a corresponding second gating unit, which is also coupled with a second enable line and is configured to control on-off between the second drive unit and the another part of the pixels based on a second enable signal provided by the second enable line; and the plurality of second drive units are also coupled with a second turn-on line and are configured to output second gate driving signals based on a second turn-on signal provided by the second turn-on line;

wherein the driver chip is coupled with a signal line coupled with a circuit in the display panel and is configured to provide a signal to the signal line.

* * * * *